United States Patent
Justice et al.

(10) Patent No.: US 6,516,056 B1
(45) Date of Patent: Feb. 4, 2003

(54) FRAUD PREVENTION SYSTEM AND METHOD

(75) Inventors: Scott C. Justice, Portland, OR (US); Eric L. Hopper, Portland, OR (US); Ken C. Obrist, Portland, OR (US)

(73) Assignee: Vesta Corporation, Portland, OR (US)

( * ) Notice: Subject to any disclaimer, the term of this patent is extended or adjusted under 35 U.S.C. 154(b) by 0 days.

(21) Appl. No.: 09/479,768

(22) Filed: Jan. 7, 2000

(51) Int. Cl.7 .................. H04M 15/00; H04M 17/00
(52) U.S. Cl. ............. 379/145; 379/114.01; 379/114.14; 379/114.15; 379/114.16; 379/144.01
(58) Field of Search ................. 379/112.01, 112.04, 379/114.01, 114.05, 114.14, 114.15, 114.16, 114.17, 114.19, 114.2, 127.02, 133, 143, 144.01, 144.03, 145, 188, 189

(56) References Cited

U.S. PATENT DOCUMENTS

| | | | |
|---|---|---|---|
| 5,463,681 A | * | 10/1995 | Vaios et al. ............. 379/189 |
| 5,504,810 A | * | 4/1996 | McNair ............... 379/189 |
| 5,566,234 A | * | 10/1996 | Reed et al. ............. 379/188 |
| 5,602,906 A | | 2/1997 | Phelps |
| 5,615,408 A | * | 3/1997 | Johnson et al. ........... 455/33.1 |
| 5,638,430 A | * | 6/1997 | Hogan et al. .......... 379/112.01 |
| 5,638,431 A | * | 6/1997 | Everett et al. ............ 379/115 |
| 5,708,422 A | | 1/1998 | Blonder et al. |
| 5,732,400 A | * | 3/1998 | Mandler et al. ............ 705/26 |
| 5,768,354 A | * | 6/1998 | Lange et al. ............. 379/189 |
| 5,802,156 A | | 9/1998 | Felger |
| 5,809,125 A | * | 9/1998 | Gammino ............. 379/189 |
| 5,875,236 A | * | 2/1999 | Jankowitz et al. ...... 379/114.01 |
| 5,894,510 A | | 4/1999 | Felger |
| 5,903,633 A | * | 5/1999 | Lorsch ............... 379/114.01 |
| 5,907,602 A | * | 5/1999 | Peel et al. ............... 379/114 |
| 5,933,480 A | | 8/1999 | Felger |
| 5,937,037 A | * | 8/1999 | Kamel et al. ............ 379/88.19 |
| 5,960,069 A | | 9/1999 | Felger |
| 5,963,625 A | * | 10/1999 | Kawecki et al. ........ 379/114.01 |
| 5,987,118 A | * | 11/1999 | Dickerman et al. .......... 379/265 |
| 6,185,545 B1 | | 2/2001 | Resnick et al. |
| 6,188,761 B1 | | 2/2001 | Dickerman et al. |
| 6,404,866 B1 | * | 6/2002 | Hopper et al. ......... 379/114.15 |

* cited by examiner

Primary Examiner—Duc Nguyen
Assistant Examiner—Quoc D Tran
(74) Attorney, Agent, or Firm—Kolisch Hartwell, P.C.

(57) ABSTRACT

A system and method for preventing fraud. The method typically includes identifying one or more fraud indicators and examining past transactions and/or a pending transaction associated with the account for the presence of the fraud indicators. The method also includes, by said examining, detecting at least one of the fraud indicators. The method also includes calculating a cumulative fraud risk level associated with the pending transaction based on the detected fraud indicators. The method may also include determining whether the cumulative fraud risk level meets or exceeds a predetermined threshold, and if the cumulative fraud risk level meets or exceeds the predetermined threshold, verifying the request for the transaction with an owner of the account. The method may further include assigning a weighted value to each of the fraud indicators. The account is typically a telephone calling account, such as a calling card account.

48 Claims, 16 Drawing Sheets

Fig. 12

Recharge

Phone Card Information

| | |
|---|---|
| Product Description | COMPANY A, PHONE CARD B |
| Card Number | XXXX XXXX XXXX |
| Card Status | ACTIVE |
| Card Balance | 00000 UNITS |
| Expiration Date | JAN 30, 2002 |
| Purchase | $60.00 (600 minutes at .10 cents per minute) |

$60.00 (600 minutes at .10 cents per minute)
$30.00 (300 minutes at .10 cents per minute)
$20.00 (200 minutes at .10 cents per minute)

Payment Information

ACCOUNT NUMBER: [ ]
EXPIRATION DATE: [ ]
SUSPECT FRAUD: [ ]

[OKAY]
[CANCEL]

Fig. 15

Find Customer — 550

| Card Lookup — 562 | Name & Zip — 564 | Alternative Lookup — 566 |

Please enter:
800 Access # [800-xxx-xxxx] — 552
Prepaid Card Number [1234567890876] — 554

Card Information — 560

| Description | Company A |
| Card Status | Active |
| Card Balance | 00000 units |
| Price 1 | $60.00 (600 minutes at .10 cents per minu... |
| Price 2 | $30.00 (300 minutes at .10 cents per minu... |
| Price 3 | $20.00 (200 minutes at .10 cents per minu... |

[Find Now]
[New Search]
[Cancel]

| First Name | Last Name | Zip | City | Address 1 | Address 2 |
|---|---|---|---|---|---|
| Jane | Doe1 | 12345 | Anytown | 123 Main Street | |
| John | Doe2 | 67890 | Sometown | 321 Main Street | |
| Jim | Doe3 | 54321 | Ourtown | 456 Main Street | |

— 558

[OK]   [New Customer] — 572 customers found

Fig. 16

| Find Customer | 562 | | | |
|---|---|---|---|---|
| Card Lookup | Name & Zip ⟵564 | Alternative Lookup ⟵566 | | Find Now |
| | | | | New Search |
| First Name | ☐ | | 568⟶ | Cancel |
| Last Name | ☐ | | | |
| City | ☐ | | | |

| First Name | Last Name | Zip | City | Address Line 1 | Address Li ⟵558 |
|---|---|---|---|---|---|
| Jan | Roe1 | 23456 | Anytown | 567 Main Street | |
| Jay | Roe2 | 56789 | Sometown | 678 Main Street | |
| Jill | Roe3 | 65432 | Ourtown | 789 Main Street | |

574⟶ OK    New Customer ⟵572 customers found

Fig. 17

Find Customer ⎯562

| Card Lookup | Name & Zip | Alternative Lookup ⎯564 |

⎯568

○ Customer ID
○ Order No
○ Credit Card No
○ Phone Number

⎯570

Find Now
New Search
Cancel

⎯558

| First Name | Last Name | Zip | City | Address 1 | Address 2 |
|---|---|---|---|---|---|
| Jan | Roe1 | 23456 | Anytown | 567 Main Street | |
| Jay | Roe2 | 56789 | Sometown | 678 Main Street | |
| Jill | Roe3 | 65432 | Ourtown | 789 Main Street | |

OK    New Customer ⎯572 customers found

⎯550

ND METHOD

TECHNICAL FIELD

This invention relates generally to fraud, and more particularly to a fraud prevention system and method.

BACKGROUND OF THE INVENTION

Fraud affects nearly every business selling goods and services remotely to customers via communications devices such as the telephone, mail, and Internet. A typical transaction involves a customer calling a customer service representative (CSR), ordering goods or services, and giving the CSR a credit card number over the telephone to pay for the goods or services. Because the CSR has no opportunity to physically inspect the credit card or a form of personal identification such as a driver's license, this type of transaction is referred to as a "card-not-present" transaction.

In a face-to-face transaction, the CSR is able to confirm that the customer's appearance matches a form of photographic identification, and that the customer's signature on a sales receipt or charge draft matches the signature on the credit card. In addition, the physical appearance and physical mannerisms of the customer may also give the CSR important clues that the transaction is fraudulent. In a card-not-present transaction, however, the inability to physically inspect the customer and the customer's personal identification, credit card, and signature leads to a high incidence of fraud.

Prior fraud control efforts in card-not-present transactions have used such devices as ZIP code verification, wherein the customer is asked to provide the ZIP code of the billing address of the credit card. Thieves find these fraud control systems easy to defeat because credit card numbers are often stolen out of the mail boxes and trash cans of residential dwellings, and customer ZIP codes are easy to obtain from these sources, and are easy to determine based on the location of a dwelling.

It would be desirable to provide a system and method for inhibiting fraud in card-not-present transactions.

SUMMARY OF THE INVENTION

A system and method for inhibiting fraud are provided. The method typically includes identifying one or more fraud indicators and examining past transactions and/or the pending transaction associated with the account for the presence of the fraud indicators. The method also includes, by said examining, detecting at least one of the fraud indicators. The method also includes calculating a cumulative fraud risk level associated with the pending transaction based on the detected fraud indicators. The method may also include determining whether the cumulative fraud risk level meets or exceeds a predetermined threshold, and if the cumulative fraud risk level meets or exceeds the predetermined threshold, verifying the request for the transaction with an owner of the account. The method may further include assigning a weighted value to each of the fraud indicators. The account is typically a telephone calling account, such as a calling card account.

In another embodiment of the invention, the method includes identify a fraud indicator and periodically scanning past transactions related to the customer account for the fraud indicator. The method also includes detecting the fraud indicator in a detected past transaction related to the account and increasing a risk level for future transactions having a parameter in common with the detected past transaction. The future transactions having a parameter in common with the detected past transactions may be future transactions associated with the same customer account as the past transactions.

The system typically includes a computing device, and a database linked to the computing device. The database is configured to store information on past transactions associated with the customer account. The system also includes an order processing program executable on the computing device. The order processing program is configured to receive a customer order and assess a risk level for the customer order based on the past transactions related to the customer account stored in the database. The system further includes a fraud queue configured to receive the customer order if the risk level of the customer order exceeds a predetermined fraud risk threshold and hold the customer order pending verification of the order.

BRIEF DESCRIPTION OF THE DRAWINGS

FIG. 12 is a view of an order entry screen of a fraud prevention system according to one embodiment of the present invention.

FIG. 15 is a view of a customer look-up screen of a fraud prevention system according to one embodiment of the present invention.

FIG. 16 is a another view of the customer look-up screen of FIG. 15, where the look-up is performed using name and address information for the customer.

FIG. 17 is a another view of the customer look-up screen of FIG. 15, where the look-up is performed using alternative customer information.

DETAILED DESCRIPTION OF THE PREFERRED EMBODIMENTS

Figure 1:
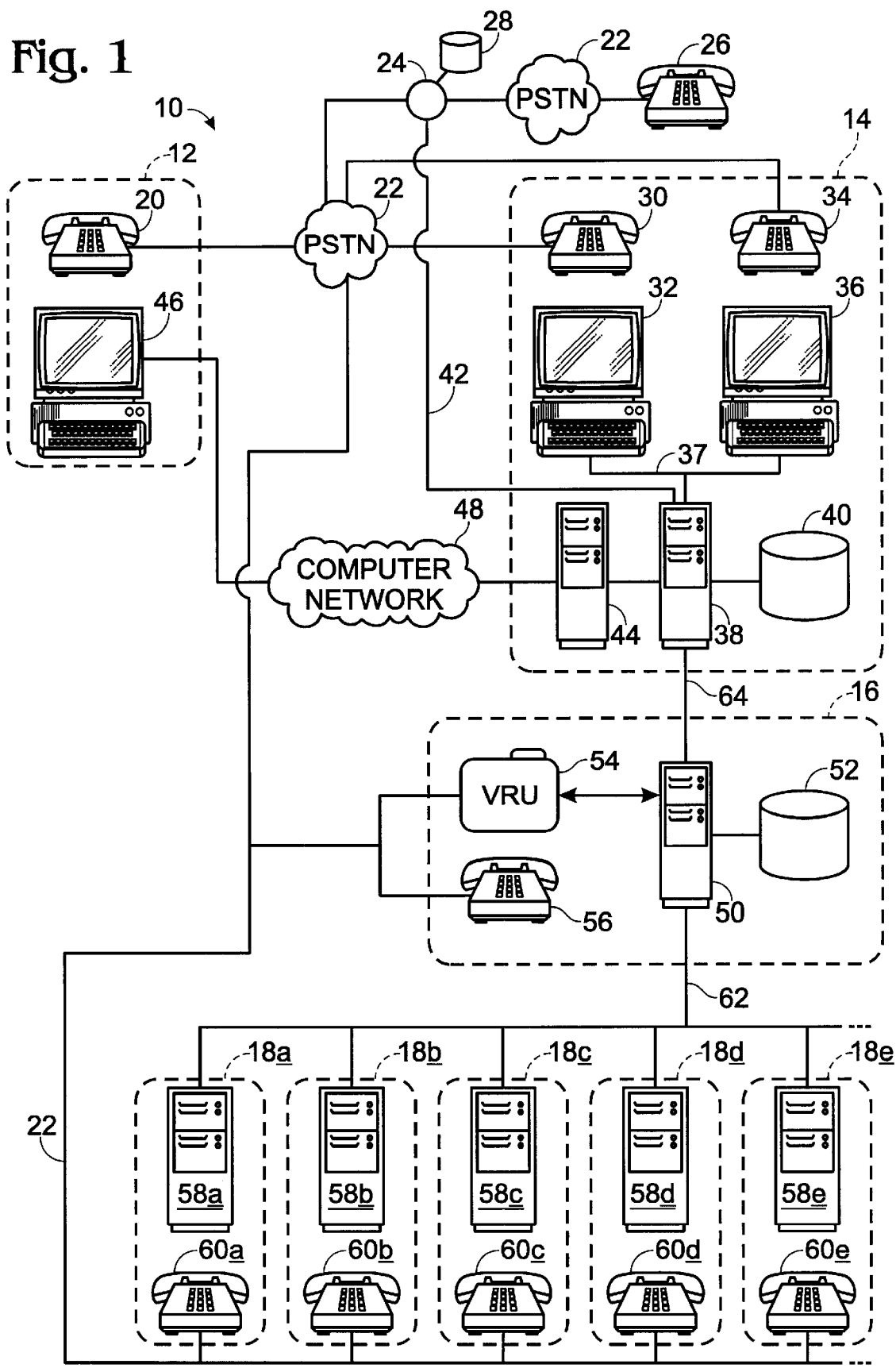
FIG. 1 is a schematic view of a fraud detection system according to one embodiment of the present invention.

Referring initially to FIG. 1, one embodiment of a fraud detection system according to the present invention is shown generally at 10. Fraud detection system 10 typically includes customer 12, who is an owner or authorized user of a customer account and a customer service center 14 configured to process transactions related to the customer account. The customer service center 14 is linked via an authorization center 16 to a plurality of issuers 18a–18e of payment accounts and associated payment cards, such as credit cards.

Figure 2:
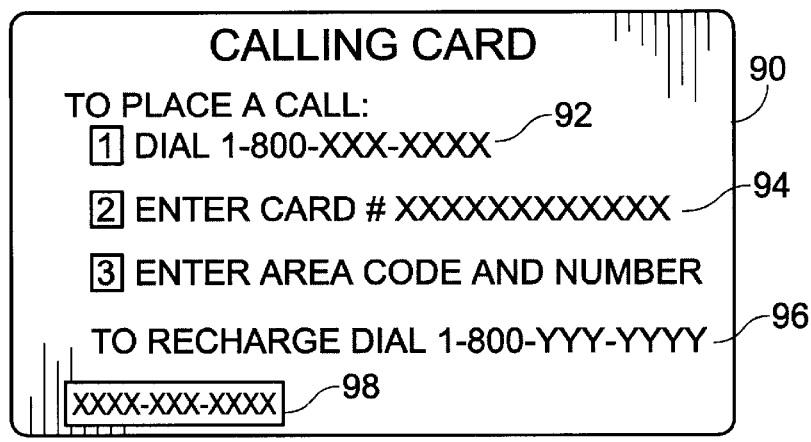
FIG. 2 is a back view of a calling card according to one embodiment of the present invention.

In one typical embodiment of the invention, the customer account is a telephone calling account with an associated calling card 90, shown in FIG. 2. To place a call using the calling card 90, the user dials a gateway access telephone number 92 from a customer telephone 20, and enters a telephone calling account designator 94, followed by a destination telephone number 96 that the customer wishes to call. Upon dialing the gateway access telephone number, customer telephone 20 is connected via a telephone network 22 to a gateway access platform 24 in a first leg of the telephone call. After the destination telephone number is entered, the gateway access platform connects itself to a destination telephone 26 at the destination telephone number in a second leg of the telephone call, and links the first leg of the telephone call to the second leg of the telephone call to connect the customer telephone 20 and the telephone 26 of the destination party. Once the call is completed, the gateway access platform 24 subtracts an appropriate number of calling units, such as minutes, from the calling account and stores the result in a calling account database 28 associated with the gateway access platform.

Typically, telephone network 22 is the Public Switched Telephone Network (PSTN), the global public telephone network accessible by most public and private telephones. Alternatively, telephone network 22 may be any other telephone network configured to transmit voice data, including a private telephone network, a local telephone network, or a packet-switched telephone network such as the Internet.

Examples of such a calling account, calling card, and gateway access platform are disclosed in pending application Ser. No. 09/436,977, filed Nov. 9, 1999 by Eric L. Hopper et al., and assigned to the assignee of the present application. The entire disclosure of this prior application is incorporated herein by reference. Alternatively, the customer account may be a membership account, merchandise account, a bank account, or virtually any other form of customer account, and may be unrelated to telephone calling accounts.

Customer service center 14 is a service bureau configured to perform transactions related to the customer account. For example, periodically, the customer may use up the calling units of a telephone calling account, and desire to add additional calling units to the calling account for a fee. The process of adding calling units to a telephone calling account is referred to herein as calling account "recharge".

Typically, customer service center 14 is configured to receive recharge requests from customer 12, add calling units to the telephone calling account, update the balance of the account in account database 28, and withdraw an appropriate fee from a payment account of the customer. The customer service center also is configured to process requests to activate and add calling units to a new calling card. The telecommunications system also may be used for virtually any other transaction related to the customer account.

Customer service center 14 typically includes a customer service representative (CSR) who operates a CSR telephone 30 and a CSR computer terminal 32. In addition, customer service center 14 typically includes a fraud clerk who operates a fraud clerk telephone 34 and a fraud clerk computer terminal 36. Each of telephones 30, 34 is linked to telephone network 22. Each of terminals 32, 36 is connected via a computer network such as intranet 37 to a customer service center server 38. Terminals 32, 36 are typically personal computers including a central processing unit and associated memory. Alternatively, the terminals 32, 36 may be handheld computers, mainframe computers, or virtually any other type of computing device. Terminals 32, 36, and server 38 are typically configured to execute an order processing program, described below. While the embodiments of the present invention may be used to process virtually any transaction, the transactions processed are typically orders for goods or services. Therefore, the terms order and transaction will be used herein interchangeably.

Typically, CSR telephone 30 is configured to be dialed via a toll-free number, such as an 800 number. Typically, the 800 number is 1-800-PRE-PAID®, or 1-800-773-7243. Alternatively, another toll-free number, or a toll number may be used. A customer typically calls from telephone 20 to a CSR at CSR telephone 30 to request a transaction be performed related to the customer account owned by the customer.

Customer service center 14 also typically includes a database 40 coupled to the customer service center server 38. Database 40 typically includes a variety of interrelated database records corresponding to transactions processed by customer service center 14. Database 40 is typically a relational database conforming to the Structured Query Language (SQL) standard, such as the SQL Server product commercially available from Microsoft® Corporation of Redmond, Wash. Alternatively, a non-relational, or non-SQL database may be used.

Database 40 contains customer account records including information such as the name, billing address, telephone number, validation period, and date of account creation for each customer account. Typically, the customer account records include, and are accessible by, a customer account number, shown at 370 in FIG. 11.

Figure 3:
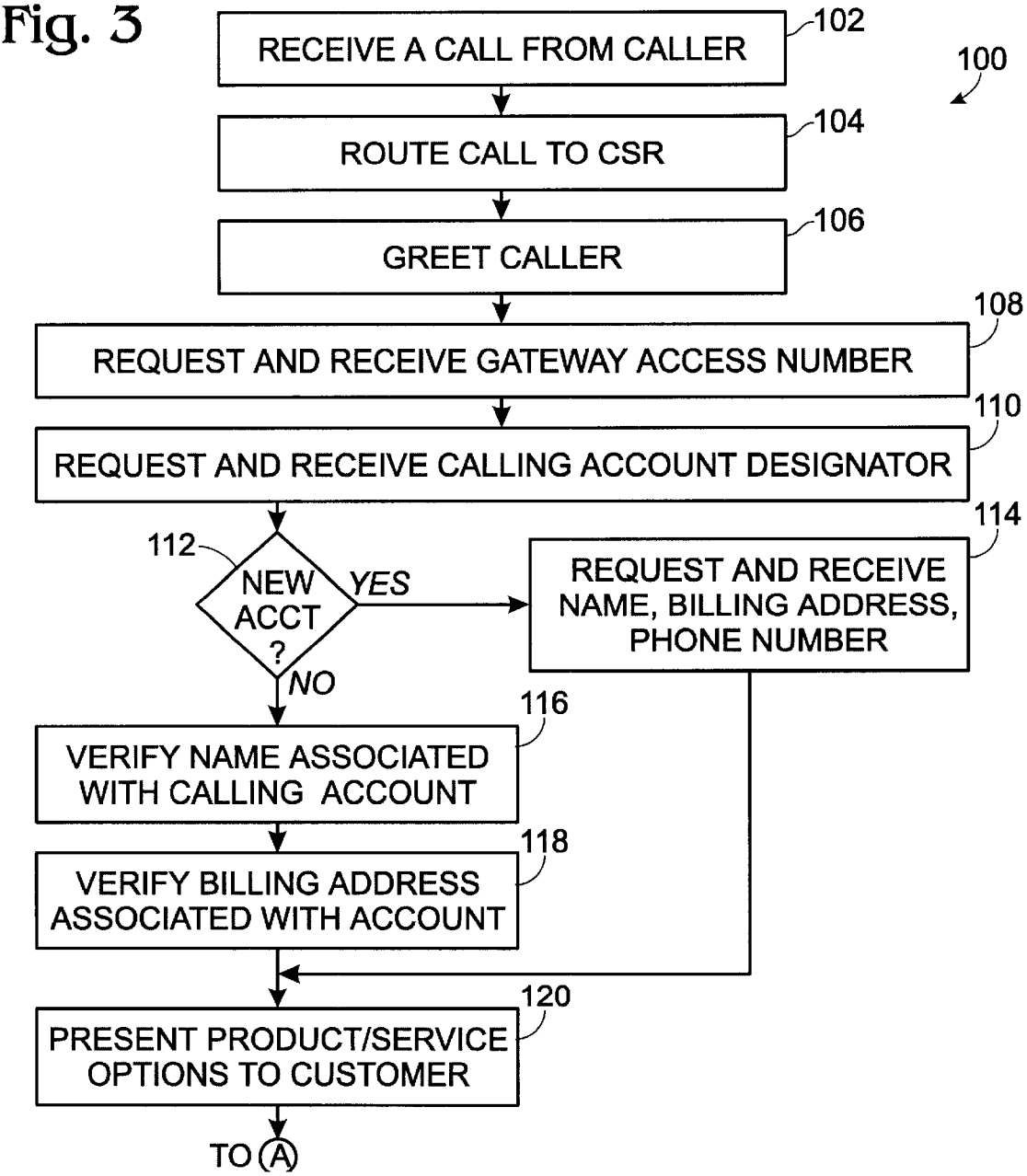
FIG. 3 is a flowchart of a method for inhibiting fraud in a transaction associated with a customer account according to one embodiment of the present invention.
Figure 4:
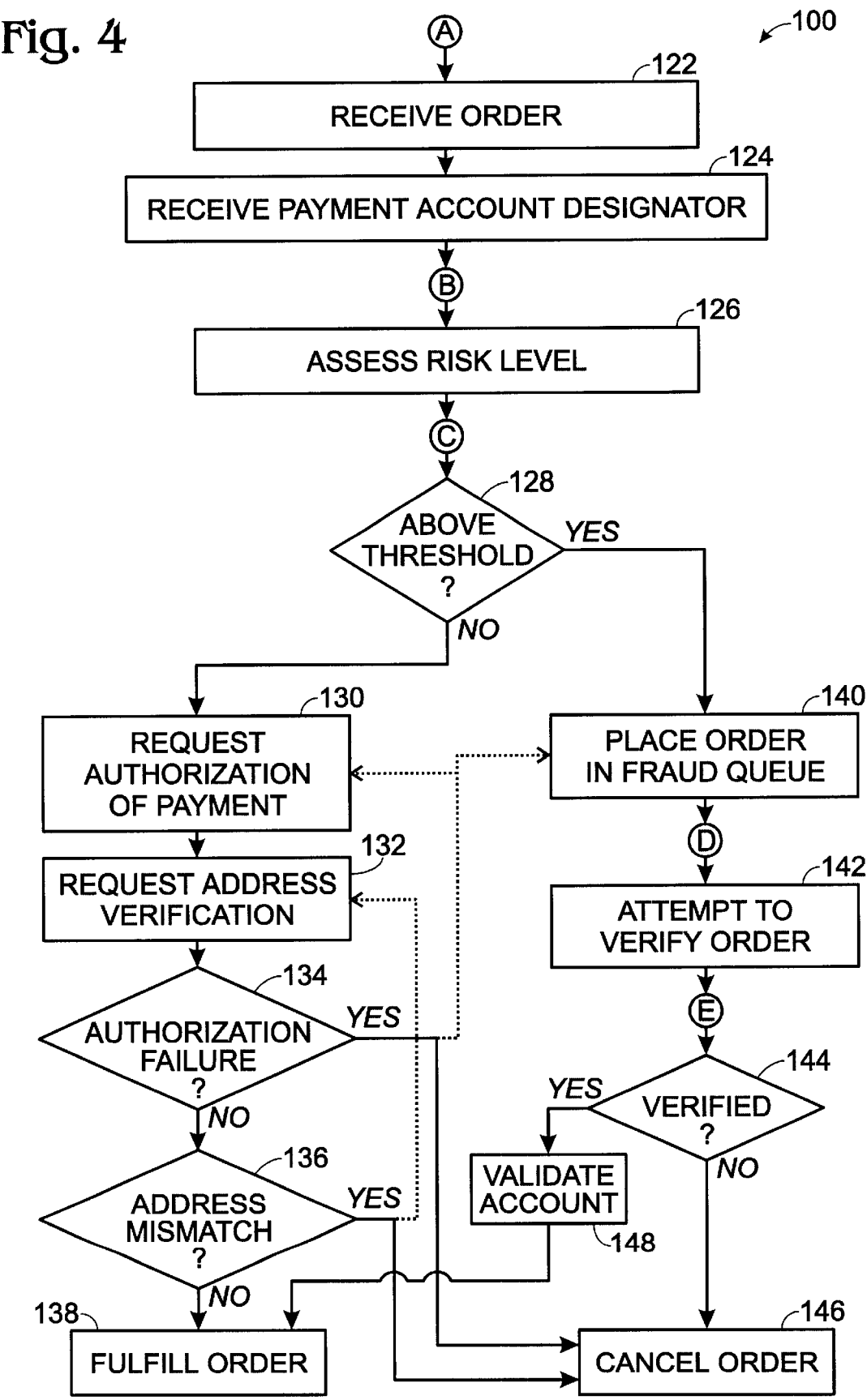
FIG. 4 is a continuation of the flowchart of FIG. 3.

The database also contains information on an order history related to each customer account. The order history for a particular customer account may be accessed by selecting order history selector 368 on customer information screen 350. Typically the order history includes a plurality of order records, including information on fulfilled and unfulfilled orders. The order records include, and are accessible by an order identification number, shown at 462 in FIG. 3. The order records also typically include information such as the date of order, time of order, product ordered, fee, payment account designator, issuer authorization request number, etc., for the order.

The database also includes historical data on issuer requests sent from the customer service center 14 to the authorization center 16 for each transaction requested by a customer. The issuer request records include information such as the amount requested and the corresponding issuer response for each transaction, and are typically accessible by an issuer request identification number. The issuer response typically includes an authorization response and an address verification response, described in detail below.

The database also typically includes strike tickets, also described below, recorded incidences of fraud, and incidences of disputed charges, including chargebacks, related to the customer account. The database typically includes information on each and every payment account used by the customer, including the account number, issuer, and issuer telephone number. The database also may include CSR and fraud clerk comments regarding the customer account. Certain of these comments may be presented to the CSR each time the customer calls the customer service center through comment pane 352 of customer information screen 350, to guide the CSR in processing orders from the customer. Finally, the customer database typically includes information on the products purchased by the customer and associated fees charged by the vendors of the products, such as the name of the product, vendor of the product, and cost of the product, typically expressed in a per-minute telephone usage rate.

It will be understood that database 40 may be queried from server 38 and/or terminals 32 and 36 in the SQL language to retrieve virtually any combination and subset of data stored therein. The queries may select, join, merge, and perform other operations on various data records based on date, amount, customer identification number, order identification number, issuer response, payment account designator, or virtually any other parameter stored in the database. For example, a list of all customer accounts having more than two incidences of fraud over the past six months may be generated.

Customer service center server 38 is linked to gateway access platform 24 through a computer network 42. Computer network 42 is typically a frame relay cloud with a guaranteed minimum data transfer rate, but may alternatively be virtually any other computer network type capable of transmitting data.

Customer service center server 38 is also typically linked to a customer interface server 44, which in turn is linked to a customer computer terminal 46 via computer network 48. Customer interface server 44 is configured to transfer or "serve" a customer interface to customer computer terminal 46. The customer interface typically is configured to receive requests from the customer for transactions related to the customer account, such as account activation requests and account recharge requests. Typically, customer interface server 44 is a web server capable of transmitting web pages in the Hyper Text Markup Language via the Hyper Text Transfer Protocol, and the customer interface is a web site. Alternatively, customer interface server 44 may be configured to communicate with customer computer terminal 46 in another language and/or protocol.

Typically, computer network 48 is a public, packet switched network such as the Internet. Alternatively, computer network 48 may be a private Local Area Network (LAN), a Wide Area Network (WAN), or virtually any other network capable of transmitting data between computers, and may not be packet switched.

Authorization center 16 includes an authorization server 50 linked to customer service center server 38 of customer service center 14 via a computer network 64. Typically computer network 64 is a TCP/IP network, although virtually any network capable of transferring data may be used. Authorization server 50 is also linked to an authorization center database 52, typically via an intranet connection.

The authorization center server is configured to receive a query regarding a particular payment account from customer service center server 38, and process the query by accessing information related to the payment account in database 52 and/or from the issuer 18a of the payment account. The query is typically initiated by the CSR at terminal 32 or the fraud clerk at terminal 36, and may be a address verification query, a payment authorization query, a payment request, or other payment account related query, as described below.

The authorization center 16 also typically includes a voice response unit (VRU) 54 linked to the authorization center server 50 and to telephone network 22. The VRU is configured to receive a voice query regarding a particular payment account from a fraud clerk or customer service representative of the customer service center, and access authorization center server 50 to answer the query. The VRU is typically configured to accept queries concerning payment authorization, address verification, payment request, etc. The CSR and/or fraud clerk of the customer service center 14 may also contact the authorization center via a telephone connection, by calling an authorization center representative at an authorization center representative telephone 56, and make such queries to a live operator.

Authorization center sever 50 is also typically linked to a plurality of issuers 18a–18e of payment accounts. Each issuer typically includes a respective issuer server 58a–58e connected to the authorization server 50 via a network connection 62. Each issuer also typically includes a respective issuer representative telephone 60a–60e, connected to telephone network 22, and through which a CSR or fraud clerk from customer service center 14 may contact the issuer.

Typically, the payment accounts are credit card accounts. Alternatively, the payment accounts may be debit accounts, bank accounts, deposit accounts, checking accounts, electronic wallet accounts, prepaid accounts, or virtually any other type of account from which funds may be withdrawn or charged to pay for a transaction. Typically each of the payment accounts includes a respective payment account card, such as a credit card, imprinted with a respective payment account designator, such as a credit card number. The payment account designator may be communicated by the customer 12 to the customer service center 14 via telephone 20 or computer network 46, to pay for a transaction related to the customer account, in a card-not-present transaction.

While in a preferred embodiment of the invention the fraud detection system includes both a customer telephone 20 and customer terminal 46, thereby enabling a customer to easily access the customer service center either via telephone or computer, it will be understood that the system may only include one or the other, or may include an alternative device configured to facilitate communication between the customer and the customer service center.

It will also be understood that the present invention may be implemented in a computer-based telephony environment, and computer network 48 and telephone network 22 may be a single network, such as the Internet, capable of transmitting both voice and data. In this embodiment of the invention, any of the telephones of the system may be a computer terminal that is equipped with speakers, microphones, and/or a headset and is configured to implement software to enable Voice Over Internet Protocol (VOIP) telephony. Computer terminals and associated software for enabling VOIP telephony are well known in the art.

Turning now to FIGS. 3–9, a method for detecting fraud in a remote or card-not-present transaction is shown generally at 100. At 102, the method typically includes receiving at the customer service center a call from a caller. Typically, the caller is a customer and owner or authorized user of a telephone calling account and associated calling card 90 serviced by the customer service center. However, the caller may also be a fraudulent actor intending to defraud the customer service center and payment account issuer. Hereinafter, for simplicity of explanation the caller will be referred to as a customer, even though the caller actually may be an imposter.

In a typical calling card recharge scenario, the call received at 102 has been placed by customer 12 to a recharge telephone number 96, printed on calling card 90. Alternatively, the customer 12 may contact the customer service center 14 via customer terminal 46 and computer network 48, using, for example, an Internet address imprinted upon card 90.

At 104, the method typically includes routing the call to the telephone 30 of a CSR at customer service center 14. The method may also include detecting the recharge telephone number 96 dialed by the caller, and routing the call to a CSR equipped to handle calls for that recharge telephone number. Typically, customer service center 14 is configured to process recharge orders for a variety of different vendors of calling cards, each vendor having a different recharge telephone number. The various recharge telephone numbers all are routed to customer service center 14, and the customer service center is able to distinguish between recharge orders for the various vendors based on the recharge telephone number dialed by the caller.

At 106, the method includes greeting the caller. At 108, the method typically includes requesting and receiving from the caller the gateway access telephone number 92 associated with the calling account. A single vendor of calling cards may offer a variety of calling card product types. The gateway access telephone number 92 enables the customer service center to determine which calling card type applies to a given transaction.

At 110, the method typically includes requesting and receiving a customer account designator. Typically the customer account designator is a calling account designator 98 associated with the calling account, and is imprinted upon the calling card 90. The calling account designator enables the customer service center to determine the particular calling card to which the present transaction should be applied.

Typically, the gateway access telephone number and calling account designator are input by the CSR into an order processing program configured to run on server 38 and terminals 32, 36. As shown in FIG. 15, the gateway access telephone number typically is input into a platform telephone number box 552 of a customer look-up screen 550 of the order entry program. The calling account designator is typically entered into calling account designator box 554 of customer look-up screen 550. Matching customer account records are then displayed in customer list pane 558, from which the CSR may select the appropriate record corresponding to the caller's account. Once the appropriate customer account record is selected, information regarding the account appears in customer account information pane 560.

The configuration of customer look-up screen 550 shown in FIG. 15 corresponds to the card lookup selector 562. FIG. 16 shows an alternative configuration of the customer look-up screen 550 accessible upon selection of name and zip selector 564, which enables the CSR to look-up customer account information by entering the customer's name and ZIP code in input boxes 568. FIG. 17 shows another alternative configuration of the customer look-up screen 550 accessible upon selection of alternative lookup selector 566. The CSR is able to look up customer account information in customer service center database 40 by inputting a customer identification number, order number, credit card number, and/or telephone number associated with the customer account, into input region 570.

At 112, the method typically includes determining whether the customer account designator corresponds to a new customer account or an existing customer account. Typically, this is accomplished by the CSR inputting the customer account designator into CSR terminal 32 via input region 552, and determining if the customer account designator is stored in the customer service center database 40. If the customer account designator is not found in database 40, then the customer account is a new customer account.

If the customer account is a new customer account, the method includes, at 114, requesting and receiving from the customer the customer's name, billing address, and home, work, and/or current telephone number. The CSR typically selects the new customer selector 572 of customer information screen 550 and is prompted by the order entry program to enter the name, billing address, and telephone number of the new customer. This information is subsequently saved to database 40.

Figure 11:
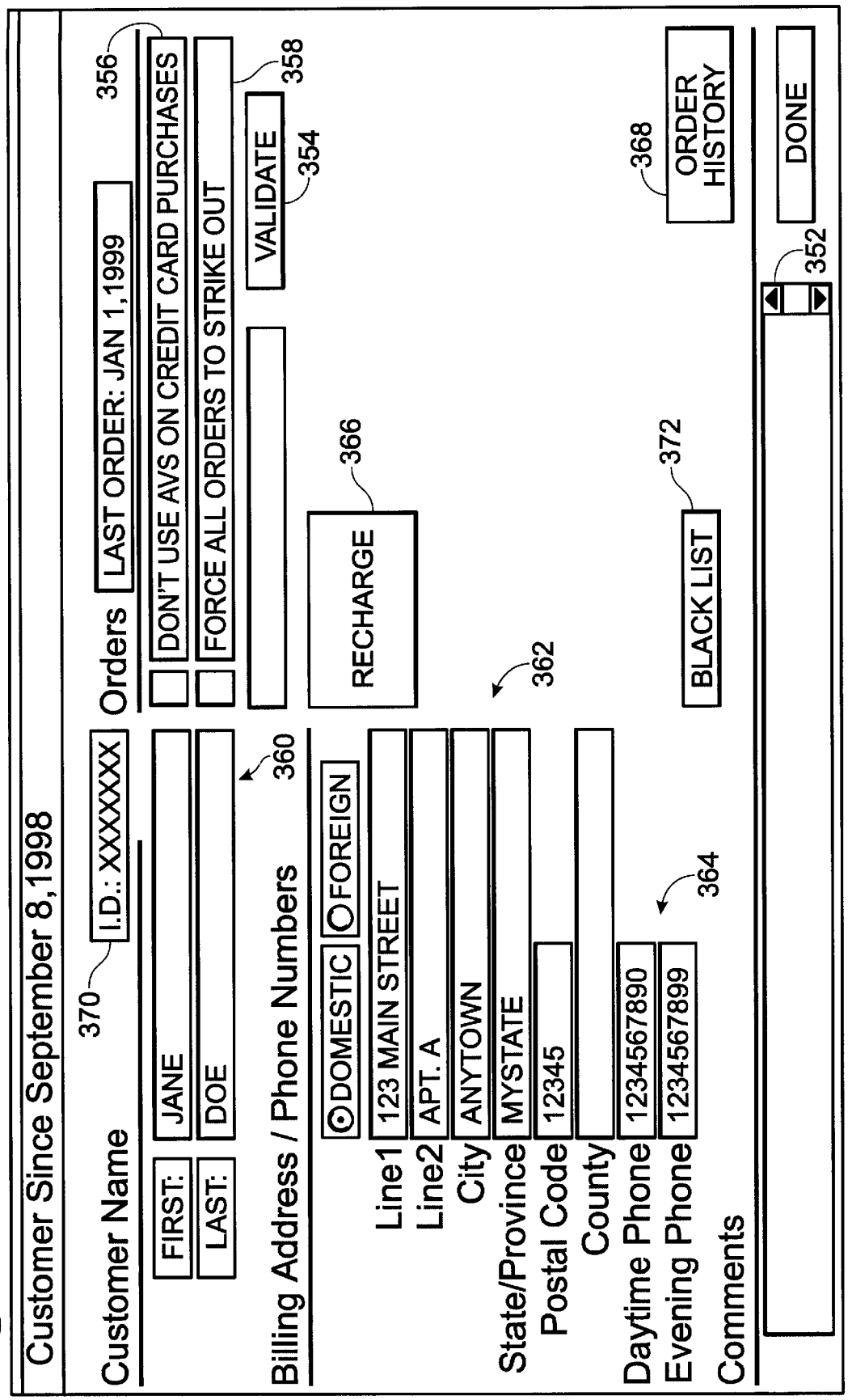
FIG. 11 is a view of a customer information screen of a fraud prevention system according to one embodiment of the present invention.

If the customer account is an existing customer account, the method includes, at 116, verifying the customer name associated with the customer account, and, at 118, verifying the billing address associated with the customer account. Upon selection of the appropriate customer indicator in the customer list of pane 558, and selection of the OK button 574, the order entry program presents to the CSR a customer information screen 350 containing the customer name 360, billing address 362, and telephone numbers 364 associated with the customer account, as shown in FIG. 11.

Verification at 116 and 118 is typically accomplished by asking the customer to state his or her name and present address, and comparing the customer's answers to the billing address and name for the account stored in database 40 and displayed on customer information screen 350. If the customer cannot provide a billing address and name that match records for the customer account in database 40, the order is typically not processed.

At 120, the method typically includes presenting a menu of product options to customer 12. The CSR typically presses the recharge button 366 on the customer information screen 350 to access a product options screen 400, shown in FIG. 12. Product options screen 400 typically includes product information 402, such as the product description, account number, account status, account balance, and account expiration date, and one or more product options 404. The CSR communicates the product options 404 to the customer to aid the customer in selecting a desired product option.

At 122, the method includes receiving an order for a transaction from the customer. Typically the order is received by the CSR and entered into the order entry screen 400 by selecting one of the product options 404, which selected product option appears in highlight box 406.

At 124, the method typically includes requesting and receiving a payment account designator from the customer. Typically, the CSR inputs the payment account designator and an associated expiration date into the payment account number box 410 and expiration date box 408 of product options screen 400. Should the CSR, in his or her judgment, suspect the transaction is fraudulent, the CSR may select a "hunch" selector 414, which will result in an increase in the risk level assigned to the transaction. For example, if the CSR recognizes the voice of a single caller who calls repeatedly under different names, the CSR may select the hunch selector to indicate that the CSR suspects a transaction by that caller is fraudulent.

As described above, payment account designator is typically a credit card number, but may also be a debit card number, stored value card number, electronic wallet number, or virtually any other payment designator configured to facilitate payment from a payment account.

At 126, the method typically includes assessing a risk level of the transaction. Assessing the risk level will be discussed in more detail below with reference to FIG. 5. Typically, the risk level is a cumulative risk level based upon attempted detection of a plurality of fraud indicators in a pending and/or in past transactions. However, a plurality of fraud indicators need not actually be detected. For example, the cumulative risk level may be based on zero, one, or more detected fraud indicators. In addition, while the cumulative risk level typically is associated with a pending transaction at the customer service center, it will also be appreciated that the cumulative risk level may be associated with the customer account, customer name, or other parameter identifying the customer or transaction. In one embodiment of the invention, the cumulative risk level is expressed in strikes, which are units of risk. Alternatively, virtually any other measure of risk may be used. While the cumulative risk level typically is wholly based on the detected fraud indicators, it may alternatively be only partially based on the detected fraud indicators.

At 128, the method further includes determining whether the assessed risk level meets or exceeds a first predetermined threshold, also referred to as a fraud queue threshold. Typically, the fraud queue threshold is three strikes. Alternatively, a fraud queue threshold of greater or lesser value may be used. If the assessed risk level is less than the fraud queue threshold, then the method further includes, at 130, requesting authorization of payment from the authorization center 16 for a predetermined payment amount. This is typically accomplished by sending a request from the customer service center server 38 to the authorization server 50. Authorization server 50, in turn determines whether the payment account contains sufficient funds or sufficient available credit to pay the payment amount. The authorization server typically contacts the issuer of the account 18a to verify that the payment account contains sufficient finds, or sufficient available credit to pay the payment amount.

Authorization server 50 typically sends a response to customer service center server 38. The response may indicate that the requested authorization is approved, or that the requested authorization is denied, for example, because (1) the payment account designator is invalid, (2) the payment amount is invalid, (3) the payment account has reached a credit floor, (4) the issuer has requested that the payment card be picked up, (5) the payment card has been reported as lost or stolen, (6) the payment card is expired, (7) an invalid institution type, expiration date, or transaction type has been entered, (10) a restraint has been placed on the card by the customer or issuer, or (11) the issuer has generically indicated the card is not to be honored. Any of these reasons for denial of an authorization may be used as a basis to increase the risk level associated with present or future transactions related to the customer account.

At 132, the method typically includes requesting an address verification for the billing address of the payment account. The CSR typically requests address verification, and authorization by selecting the "okay" selector 412 on product options screen 400.

Address verification may be accomplished by sending the billing address associated with the customer account and stored in customer service center database 40 to authorization server 50. Authorization server 50 in turn sends a query to an appropriate issuer 18a, requesting the issuer to verify whether the customer address on file with the issuer 18a of the payment account matches the customer address on record with the customer service center 14. Alternatively, authorization center 16 may access internal records stored in database 52 and compare the name and address received from customer service center 14 to a name and address for the payment account stored in database 52.

The authorization server 50 typically sends a response to the customer service center server 38 indicating that there was no match, or only a partial match of the billing addresses. The authorization server may indicate a degree of match to the customer service center server. For example, the authorization server 50 may respond that the ZIP code and street number did not match.

While the requests for authorization and address verification are typically sent in a single request to a single authorization center, it will be appreciated that the requests may be separate requests and may be sent to separate organizations for processing. Likewise, while the responses form the authorization center 16 typically are included in a single response, there may alternatively be separate responses for the authorization query and address verification query.

The CSR and/or fraud clerk may also instruct the order processing program to not conduct address verification for a particular customer. This typically occurs where it is known by customer service center 14 that the customer is a valid customer, even though the customer's address does not match the address on record with the issuer 18a of the customer's payment account. This is typically accomplished by selecting an appropriate address verification avoidance selector 356 on customer information screen 350.

At 134, the method typically includes determining whether there was an authorization failure. Typically, if an authorization failure is detected, the method includes canceling the order at 146. Alternatively, if there is a failure due to no response from authorization center 50 or issuer 18a, or due to a credit floor, restraint, invalid amount, or do-not-honor response, or because issuer 18a is unavailable, or for some other predetermined reason, the method may include requesting a new payment account designator from the customer. The method may also include re-requesting authorization at 130 using the new payment account designator. In addition, if, at 134, there is a failure due to a pick-up or lost or stolen response, then the order may be placed in the fraud queue at 140 for later review by a fraud clerk.

At 136, the method also typically includes determining whether there was an address match failure. Typically, this is accomplished by determining whether there was a complete address match failure. A partial address match failure alternatively may be used to make the determination. If an address match failure is detected, the method typically includes canceling the order, as shown at 146. Alternatively, the method may include asking the customer to verify or resubmit the billing address, and then re-requesting address verification of the newly submitted billing address at 132.

If neither an authorization failure, nor an address mismatch failure is detected at 134 or 136, the method, includes fulfilling the order, as shown at 138. Fulfilling the order is typically accomplished by crediting time to the customer account, and updating a calling unit balance of the calling account in the account database 28 associated with gateway access platform 24. Alternatively, the order may be fulfilled by carrying out virtually any other transaction related to the customer account. For example, the order may be fulfilled by sending a product to the customer.

If, at 128, the assessed risk level meets or exceeds the predetermined fraud queue threshold, the order typically is placed in a fraud queue for review by a fraud clerk, as shown at 140. Placing an order in the fraud queue is referred to as "striking out" the order, because in one embodiment of the invention the risk level of the transaction is expressed in "strikes" earned for the presence of fraud indicators. Typically, the order is placed in the fraud queue automatically by the order processing program.

By placing the order in the fraud queue, fulfillment of the order is deferred until the order may be verified by a fraud clerk. Alternatively, subsequent review and verification of the order may be executed by the CSR, or any other person associated with the customer service center.

Figure 13:
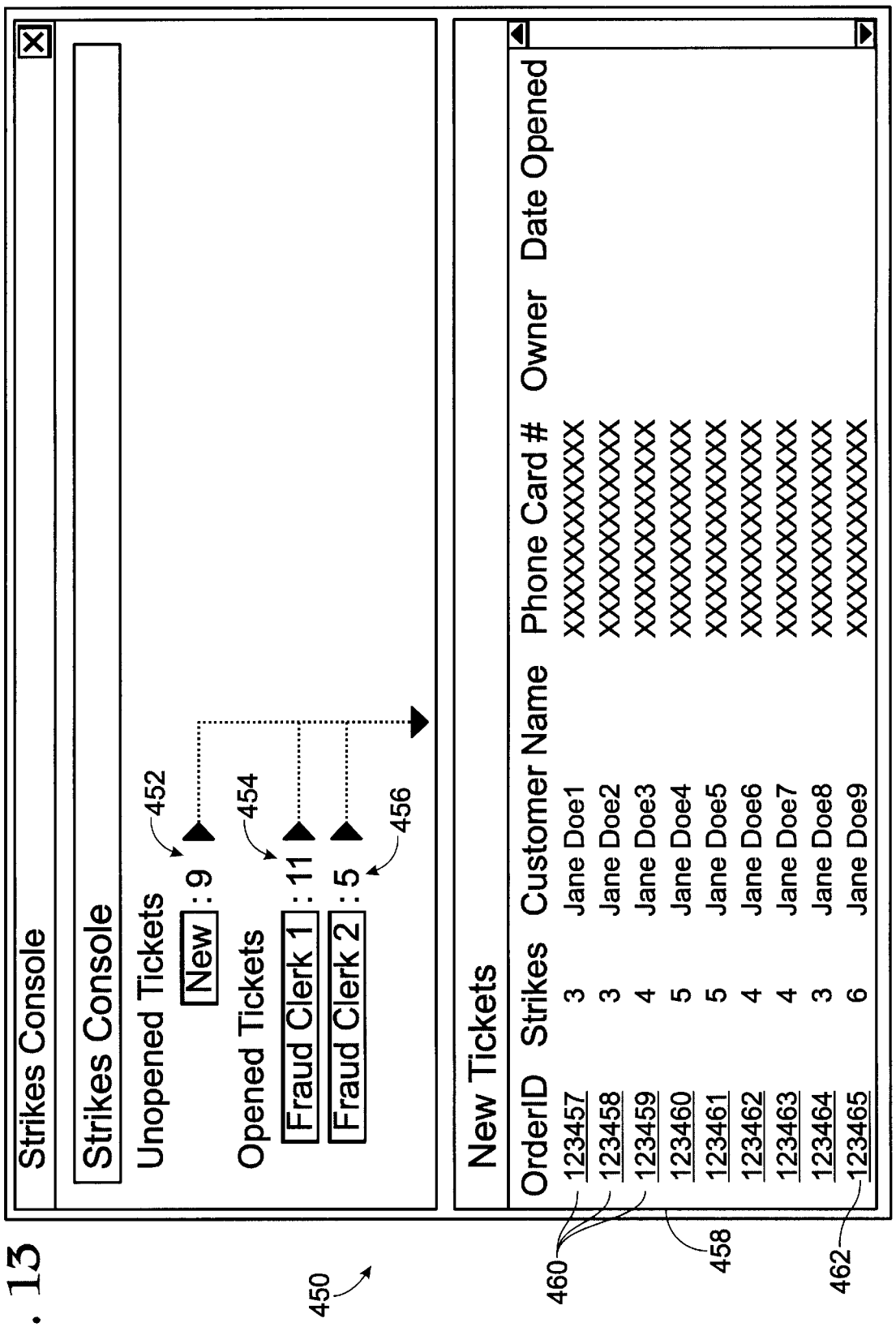
FIG. 13 is a view of an fraud queue screen of a fraud prevention system according to one embodiment of the present invention.

The fraud queue may be accessed by the fraud clerk and CSR through fraud queue console 450, shown in FIG. 13. Fraud queue console 450 is also referred to as a strike console 450 because it typically contains information on strikes assessed for a particular order. The strike console 450 typically contains an unopened ticket queue 452, and queues 454 and 456, respectively including tickets assigned to each fraud clerk. A fraud clerk may select any of queues 452–456 by clicking on an associated hyperlink, and may view in queue pane 458 each of the queued orders 460 contained in the selected fraud queue.

Figure 14:
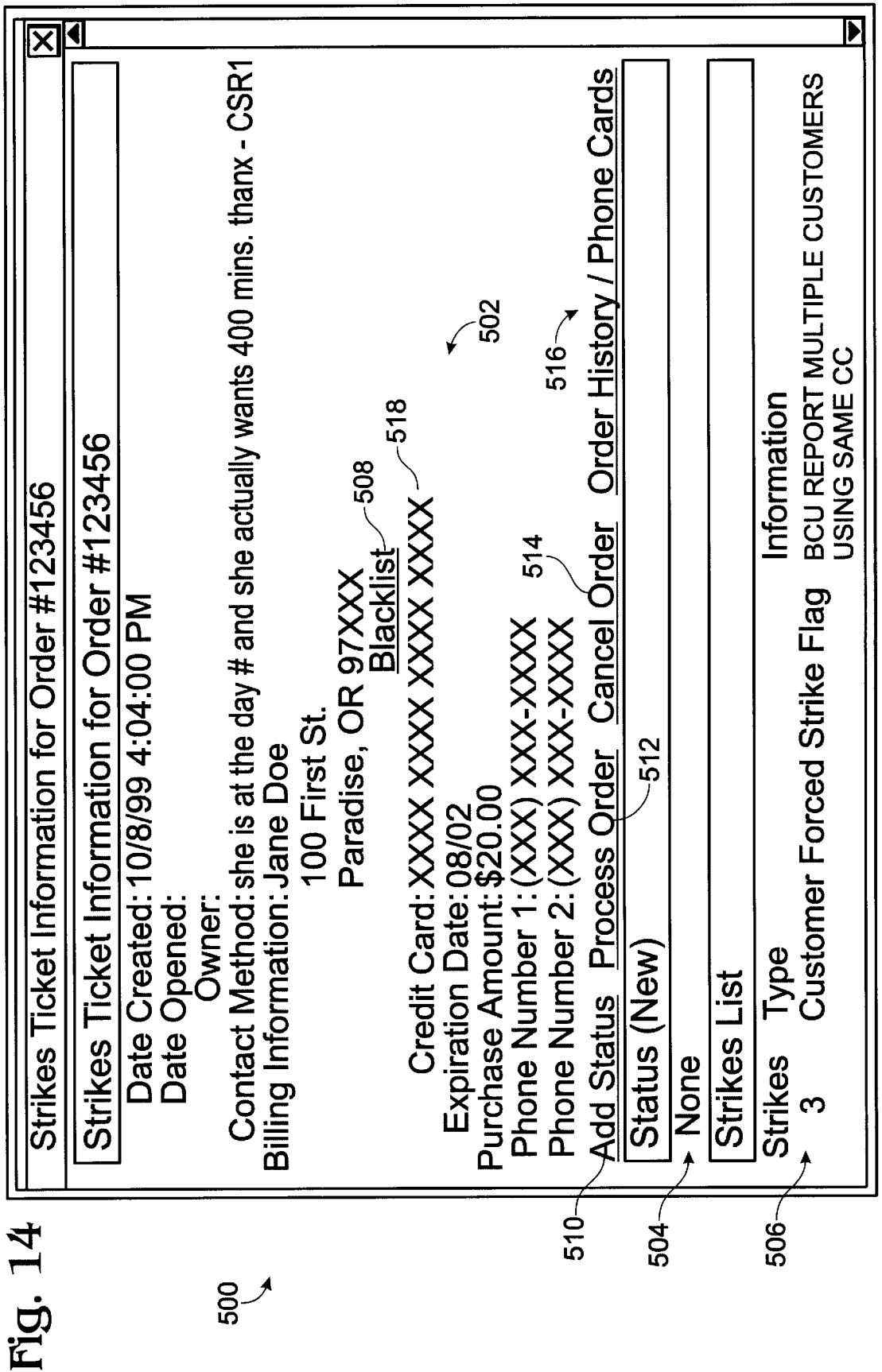
FIG. 14 is a view of an fraud ticket screen of a fraud prevention system according to one embodiment of the present invention.

The CSR or fraud clerk may in turn select one of queued orders 460 to access a detailed view of the queued order, referred to as a strike ticket 500, as shown in FIG. 14. Strike ticket 500 typically includes account information 502 such as the date the strike ticket was created, the date the strike ticket was opened by a fraud clerk, the fraud clerk that "owns" or is assigned to the strike ticket, a contact method for the customer placing the order (typically the present telephone number of the customer such as a mobile telephone number), the name of the customer, billing address of the customer, payment account designator of the customer (typically a credit card number), the expiration date of the credit card, the requested purchase amount of the order, the telephone number of the customer account, as well as a status of the strike ticket 504 and detailed strike list 506 of all strikes against the account. Typically the status 504 of the strike ticket may be new, opened, or processed. If the status is opened, the status may also indicate a particular fraud clerk who owns the strike ticket. The fraud clerk may alter the status of the strike ticket by selecting the add status selector at 510. The fraud clerk may instruct that the order be processed by selecting a process selector 512, and may cancel the order through cancel selector 514. The order history, including all past transactions associated with the customer account, as well a list of all other calling accounts owned by the same customer, may be viewed by selecting the order history/phone cards selector 516. The fraud clerk or CSR may blacklist a particular customer by selecting blacklist selector 508, thereby placing the customer account, all related telephone cards, and all related credit cards on a blacklist kept on database 40. The CSR may also blacklist a customer account by selecting blacklist selector 372 on customer information screen 350. Alternatively, the blacklist may contain only one of the aforementioned data categories, or may contain other information related to the customer account, such as customer name, or billing address.

At 142, the method typically includes attempting to verify the order, which will be discussed below in more detail with reference to FIG. 9. At 144, the method includes determining whether the order was verified. If the order was not verified, then at 146 the method includes canceling the order.

If it is determined at 146 that the order was verified, then at 148 the method typically includes validating the customer account. Typically, validation of the customer account is accomplished by selecting validation button 354 of customer information screen 350. Validation of the account typically causes customer service center server 38 not to send subsequent orders for the validated customer account to the fraud queue for a predetermined period of time, even if fraud indicators are present in the pending or past transactions associated with the account and the risk level for the transaction is above the predetermined threshold.

Typically, the period of time for validation is based on the length of time since activation of the customer account. For most customers, this corresponds to the length of time the person has been a customer of a particular calling card service. A customer account that has been active for between about zero and three months typically is not validated at all, while a customer account that has been activated for between about three and six months typically is validated for between about 5 and 30 days, a customer account that has been activated for between about six and nine months typically is validated for about 60 days, a customer account that has been activated for between about nine and twelve months typically is validated for about 90 days, and a customer that has been activated for twelve months or more typically is validated for 180 days. In addition, certain preferred customer accounts may be validated for a predetermined period of time such as a year. Alternatively, the validation period may be uniform for all validated accounts, or may be based on some other predetermined criteria. In this manner, subsequent customer transactions for the validated account will not be unnecessarily delayed by placement of the pending order in the fraud queue. After the customer account has been validated, at 138 the method typically includes fulfilling the order, as described above.

In one alternative embodiment of the invention, after step 126 and before step 128 the method includes determining whether the assessed risk level associated with the transaction meets or exceeds a predetermined intermediate threshold. If so, the method may include documenting details regarding the pending transaction by inserting a comment in a comment region 352 of customer information screen 350. The comments may include (1) an OK TO PROCESS comment indicating that the order should be processed in spite of fraud indicators detected in the pending or past transactions associated with the account, (2) a MATCH comment indicating that customer service center 14 records for customer information such as name, billing address, and telephone number match payment account issuer records, (3) a NO MATCH comment indicating that either one or more of the name, address, or telephone number on record at customer service center 14 do not match payment account issuer records, (4) a TRANSFER TO SPECIALIST comment indicating that the customer is suspicious and caution should be used when processing transactions, (5) a DO NOT PROCESS comment indicating that future orders from this customer should not be processed, but should be placed in the fraud queue, (6) a CHARGEBACK comment indicating that the customer currently has a disputed charge with customer service center 14 and future orders should be processed only with the approval of a fraud specialist or virtually any other comment related to the status of the customer account. Alternatively, the comments may be placed in the customer service center database and accessible via an order history display, rather than displayed in comment region 352 of customer information screen 350. In addition, it should be understood that the fraud detection system may not employ any comment mechanism at all. Typically, the intermediate threshold is two strikes, although virtually any predetermined level of risk may be used.

Figure 5:
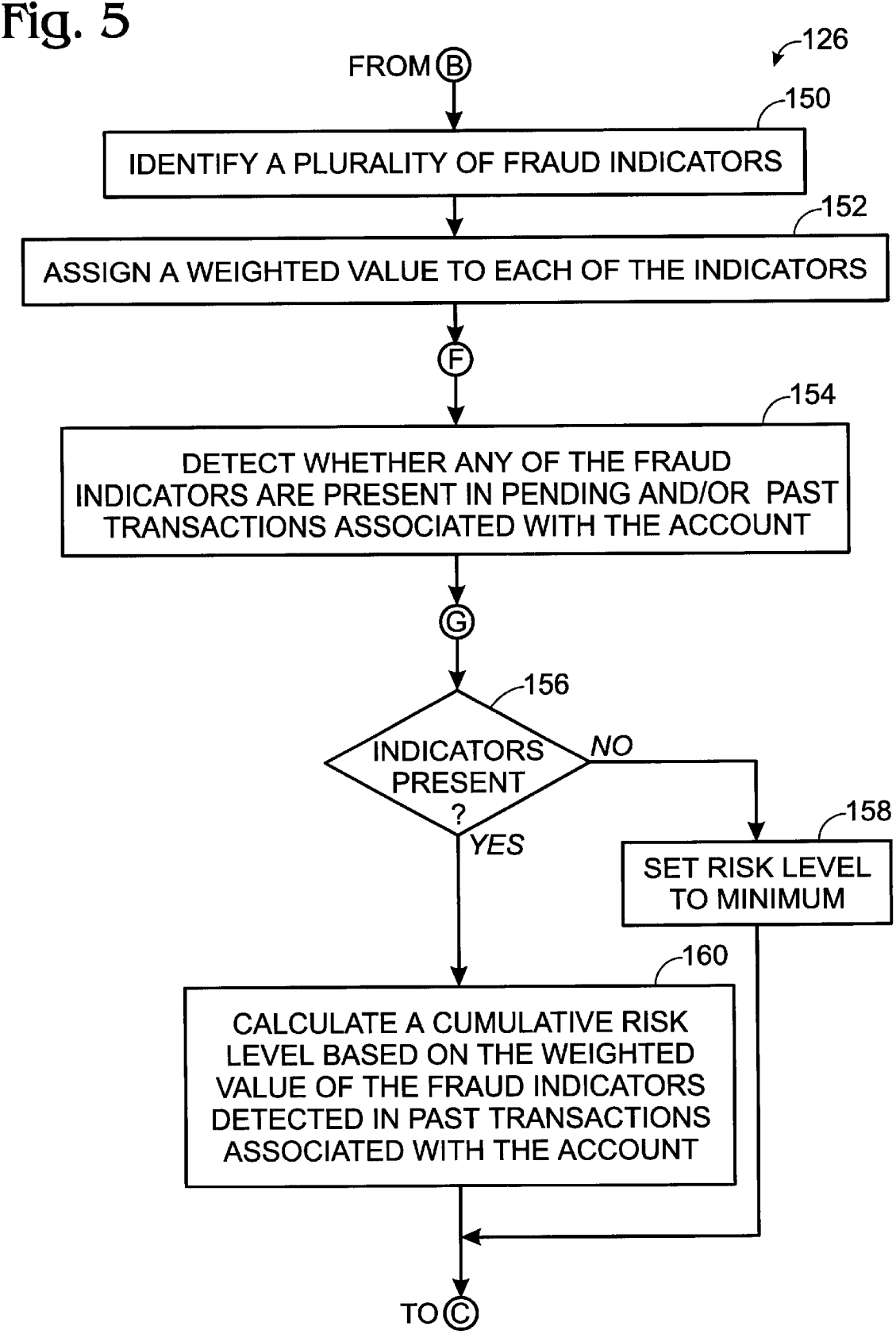
FIG. 5 is a detail flowchart of a portion of the method shown in FIG. 4.
Figure 6:
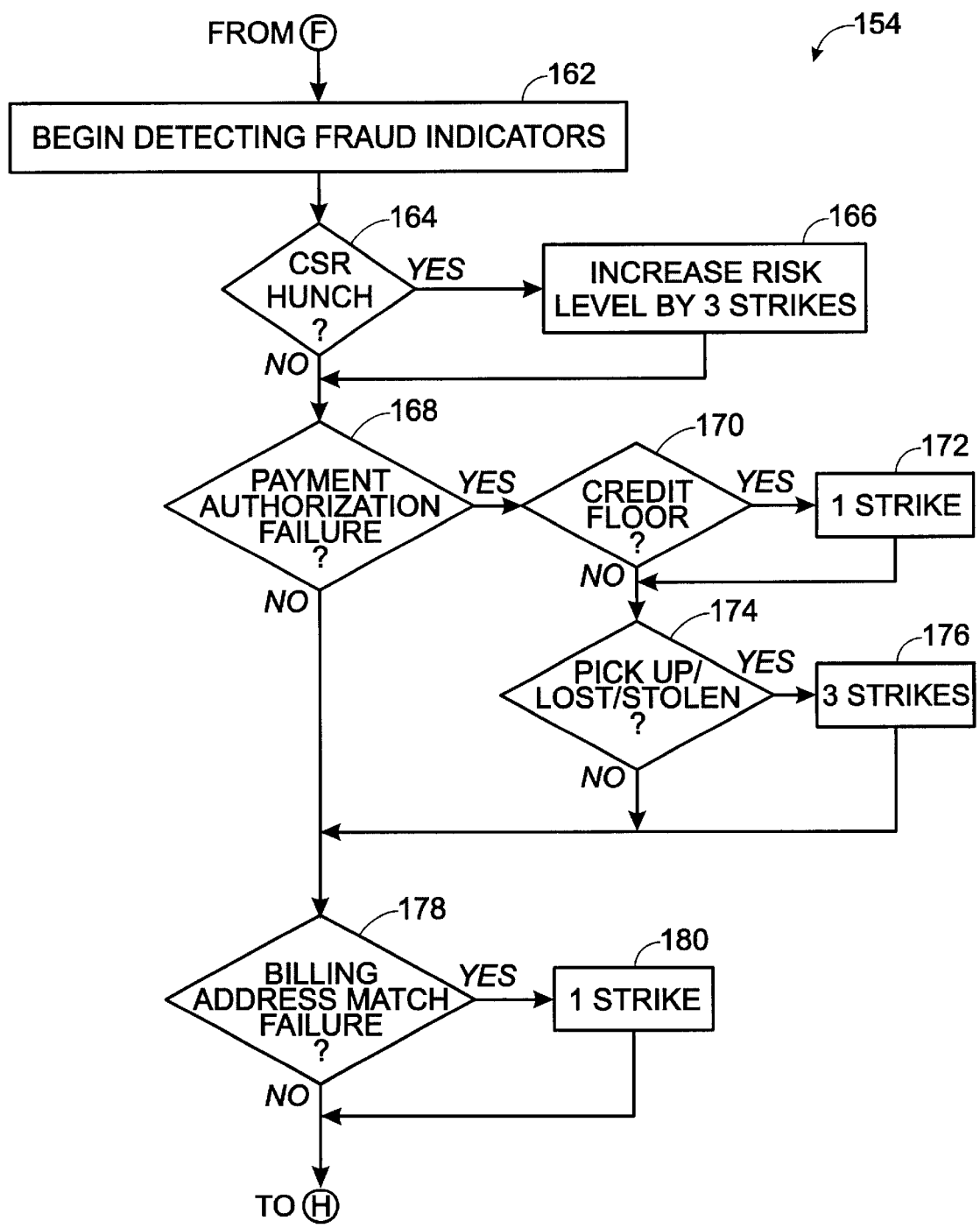
FIG. 6 is a detail flowchart of a portion of the method shown in FIG. 5.
Figure 7:
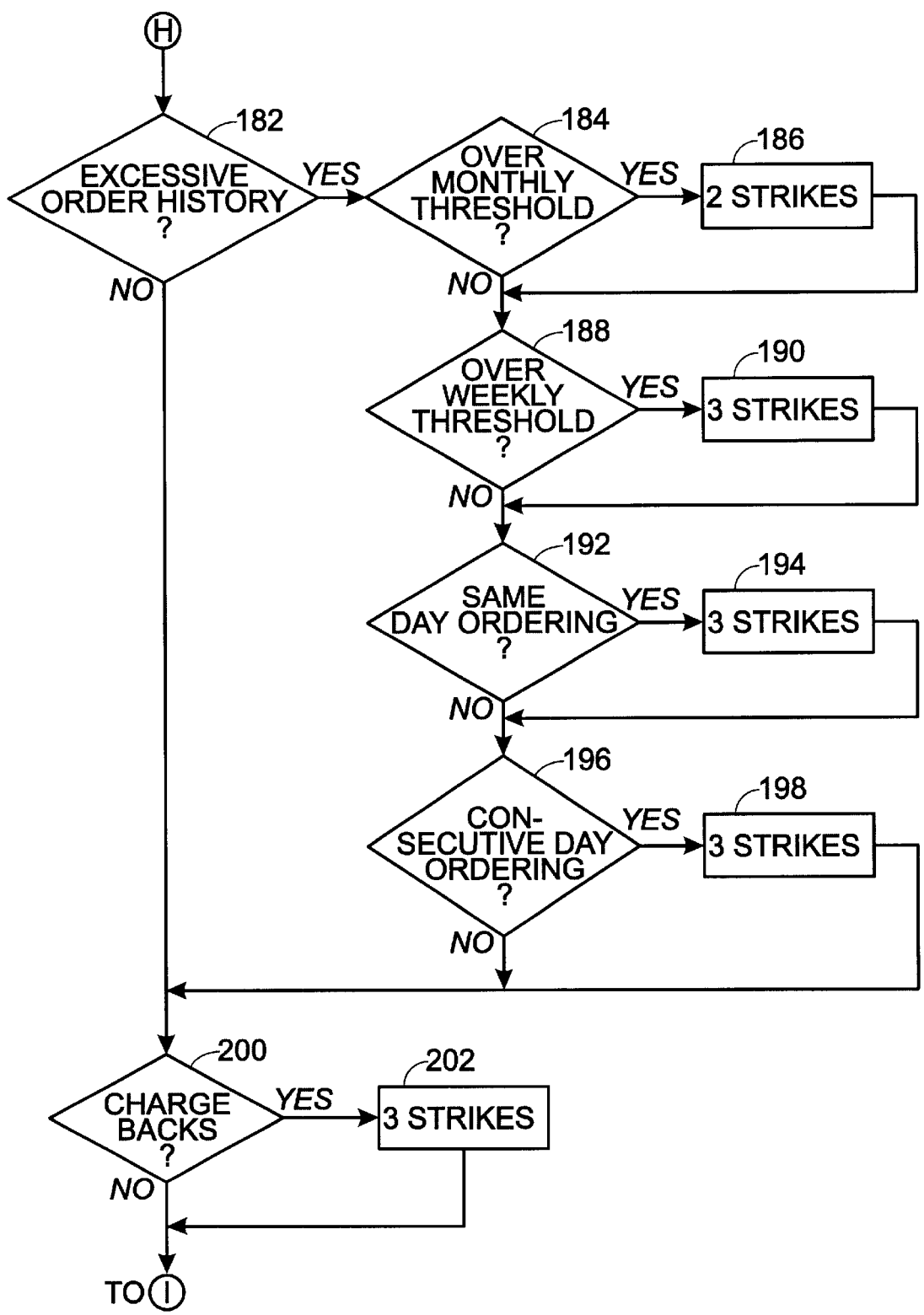
FIG. 7 is a continuation of the flowchart of FIG. 6.
Figure 8:
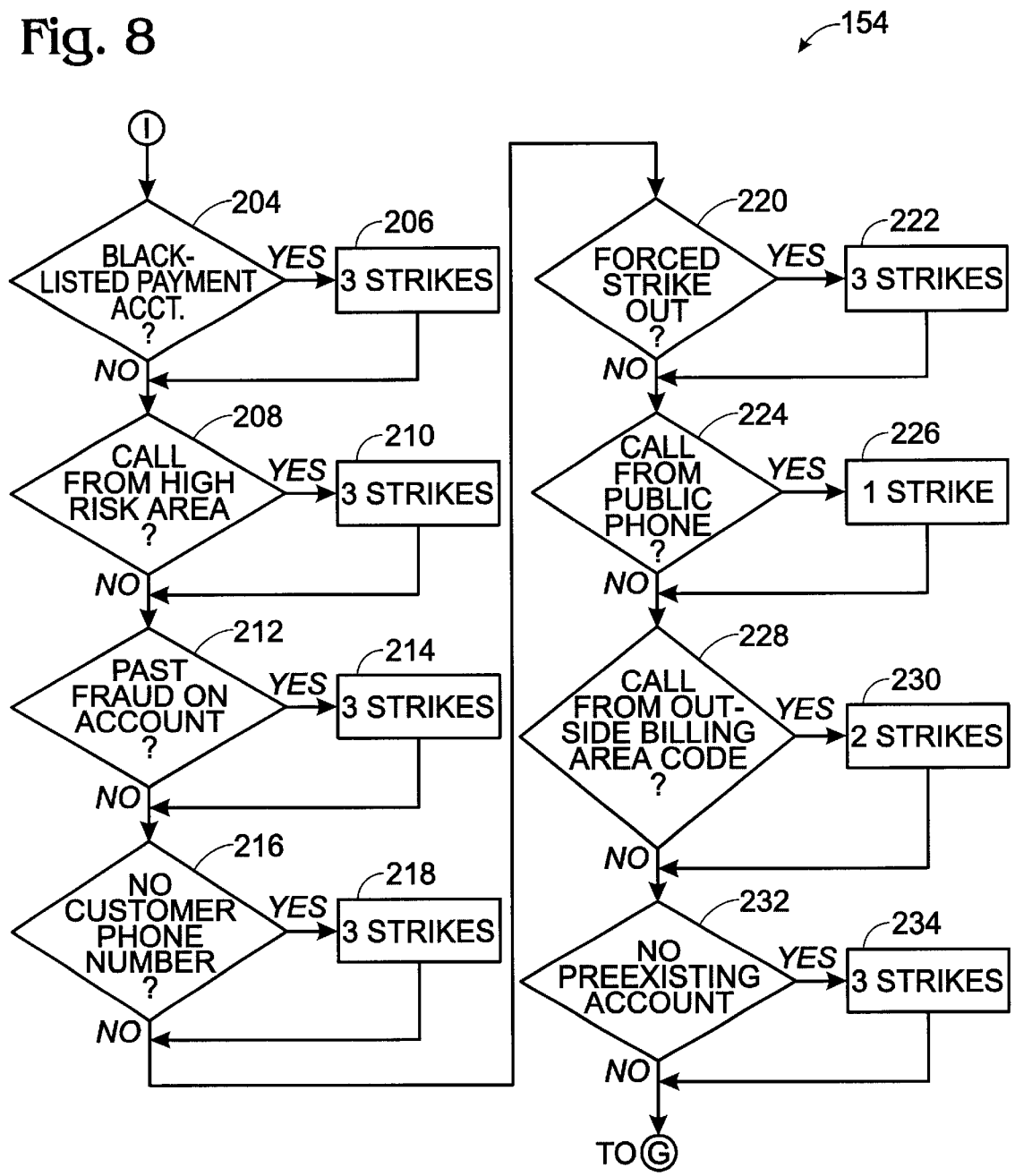
FIG. 8 is a continuation of the flowchart of FIG. 7.

Turning now to FIG. 5, assessing a risk level at 128 typically includes, at 150, identifying a plurality of fraud indicators. The fraud indicators may be determined from empirical research, corporate know-how, intuition, etc., and are discussed in detail below. The fraud indicators typically are identified before the customer calls the customer service center to request a transaction related to the customer account. Alternatively, the fraud indicators may be determined after the customer calls customer service center 14, or at any preselected time during the ordering process.

At 152, the method may include assigning each of the fraud indicators a weighted value. As described above, the weighted value typically is expressed in "strikes", which are units of risk. Typically, a fraud indicator may be assigned a weighted value of from one to three strikes, based on the accuracy of the fraud indicator in predicting fraud. In addition, the predetermined threshold at 128 typically is three strikes. Alternatively, the predetermined threshold may have a value greater or less than three strikes, for example, four strikes, or one or more strikes, and some of the fraud indicators may have a weighted value of more than three strikes. In addition, it will be understood that another suitable predetermined weighting scheme may be used. For example, the risk units may be weighted on a scale of 1 to 10, and/or may be expressed in decimal or fractional units.

At 154, the method typically includes detecting whether any of the fraud indicators are present in the pending or past transactions associated with the account, as described in detail below with reference to FIGS. 6–9.

At 156, the method typically includes determining if none of the fraud indicators are present, and if none are present, setting the risk level to a minimum value at 158. Typically, the minimum value is zero, although another predetermined minimum value may be used. If at least one of the fraud indicators is present, then the method at 160 includes calculating a cumulative risk level based on the weighted value of the fraud indicators detected in the pending or past transactions associated with the account. Typically, this is accomplished by adding the weighted value of the fraud indicators together. Alternatively, another suitable calculation mechanism may be used. For example, where the fraud indicators are weighted equally, the risk level may be accomplished by counting the number of strikes.

Turning now to FIGS. 6–9, detecting whether any fraud indicators are present in the pending or past transactions associated with the customer account at 154 typically includes, at 162, beginning detecting whether any fraud indicators are present. Typically fraud indicators present in past transactions are detected by querying records stored in database 40.

At 164, the method typically includes determining whether a CSR hunch flag is set for the pending transaction. As described above, the CSR may indicate that he or she suspects a particular transaction is fraudulent by checking a CSR hunch check box, shown at 414 in FIG. 12. If the CSR hunch check box 414 is checked, and therefore the CSR hunch flag is set, the method includes at 166 increasing a cumulative risk level associated with the pending transaction by three strikes, thereby typically forcing the order to strike out. Alternatively, the cumulative risk level may be increased by another amount. The method may alternatively include detecting whether the CSR hunch flag has been set for past transactions associated with the account.

At 168, the method typically includes determining whether there are any payment authorization failures in past transactions associated with the customer account. The payment authorization failure may be a credit floor authorization failure, in which the proposed transaction fee would put the credit account over a credit limit for the payment account. The payment authorization failure may also be a pick up authorization failure, in which the issuer has asked that merchants pick up the payment card if anyone attempts to use it. The payment authorization failure may also be a lost or stolen authorization failure, in which the issuer indicates that the payment card has been reported lost or stolen, and should not be honored. Alternatively, the payment authorization failure may be virtually any other authorization failure reported by the issuer or authorization center to the customer service center.

As indicated at 170, method typically further includes determining whether there are any credit floor authorization failures in past transactions associated with the account. In a credit floor authorization failure, the issuer refused authorization because the proposed transaction would have put the credit account over a preestablished credit limit for the account. At 172, if a credit floor authorization failure is detected, the method includes increasing the cumulative risk level associated with the transaction by one or more strikes.

At 174, the method typically includes determining whether there are any "pick up" or "lost or stolen" authorization failures associated with past transactions on the account. If so, at 176 the method includes increasing the cumulative risk level associated with the transaction by three strikes.

At 178, the method typically includes determining whether there are any billing address match failures in past transactions associated with the account. Typically, the billing address is checked via an address verification service offered by the authorization center 16, as described above. The billing address match failure is usually a complete billing address mismatch between the billing address stored at the customer service center and a billing address on file with the issuer. Alternatively, the billing address match failure may be a partial mismatch, such as a mismatched ZIP code or apartment number. At 180, the method typically includes increasing the cumulative risk level associated with the transaction by adding one or more strikes. Alternatively, the billing address match failures may be detected in the pending transaction.

At 182, the method typically includes determining whether there is an excessive order history associated with the customer account, that is, whether a predetermined parameter such as frequency, amount, or duration of the past transactions on the customer account exceeds a predetermined threshold. The excessive order history may, for example, be an order history exceeding a predetermined monthly threshold, exceeding a predetermined weekly threshold, or including same-day or consecutive-day ordering, as described below.

At 184, the method typically determines whether past transactions in the order history associated with the account meet or exceed a predetermined monthly threshold. Typically, order activity of the past 30 days is compared against the monthly threshold. Alternatively, order activity of the most recent calendar month may be compared against the predetermined monthly threshold. Typically, the predetermined monthly threshold is between about $50 and $300 per month, and is preferably about $150 per month. Alternatively, the predetermined monthly threshold may be about $200 per month or some preselected value outside the range of $50 to $300 per month. While typically the predetermined monthly threshold is a dollar amount, the predetermined monthly threshold may also be a number of calling units, such as minutes, or have some other predetermined units. If past transactions in the order history exceed the predetermined monthly threshold, the method, at 186, includes increasing the cumulative risk level associated with the transaction, adding strikes (typically three).

At 188, the method typically includes determining whether past transactions in the order history of the account meet or exceed a predetermined weekly threshold. Typically, transactions occurring within the past 7 days are compared to the predetermined weekly threshold. Alternatively, the past calendar week, or some other seven-day period may be used. The predetermined weekly threshold is typically between about $50 and $150, and is preferably about $100. Alternatively, the predetermined weekly threshold may be $75, or some other predetermined value outside of the range of $50 to $150. In addition, the predetermined weekly threshold may be expressed in units other than dollars. For example, time units such as minutes may be used. If past transactions in the order history exceed the predetermined weekly threshold, the method, at 190, includes increasing the cumulative risk level associated with the transaction by strikes (typically two). In addition, the predetermined monthly and weekly thresholds may be periodically and/or arbitrarily changed to thwart prediction by fraud rings.

The method also typically includes detecting whether the frequency of transactions in the order history exceeds a predetermined threshold. At 192 and 196, respectively, the method typically includes determining whether the order history includes any same-day order activity, or consecutive day order activity. If a plurality of transactions have been made on the account on the same day or on consecutive days, the method, at 194 and 198, respectively, includes increasing the cumulative risk level associated with the transaction by adding strikes (typically three).

At 200, the method typically includes detecting whether there having been any charges disputed and unpaid by the customer, referred to in the credit industry as "chargebacks". At 202, if a chargeback is detected in the order history associated with the customer account, the cumulative risk level associated with the transaction is increased by adding strikes (typically three).

At 204, the method typically includes determining whether the payment account, typically a credit or debit card account, has been placed on a list of payment accounts known to be fraud risks. This list is referred to herein as a payment account blacklist. This payment account may be internally generated by the customer service center, or may be purchased from an outside credit agency. At 206, if the payment account is determined to be on a blacklist, the cumulative fraud level associated with the account is increased by three strikes. Blacklists may also be maintained for customer accounts, customer names, billing addresses, or virtually any other parameter indicative of fraudulent activity.

At 208, the method typically includes determining whether the call received at 102 in the pending transaction is being placed from a predefined high risk area. The area from which the call is being placed may be determined by asking the customer, or by automatically detecting the area code in the Automated Number Identification (ANI) associated with the call from the customer. Typically, the predefined high risk areas are New York City, Bronx, Brooklyn, Miami, and Los Angeles. The high-risk area also may be limited to a particular telephone number or group of telephone numbers. For example, if a fraud ring is suspected to operate out of a particular hotel, then the method may include assigning three strikes to the cumulative risk level of any transaction requested from telephone numbers from that hotel. The predefined high-risk areas may change, as incidences of fraud migrate from area to area. Alternatively, the method may include detecting whether calls in past transactions associated with the account were placed from a predefined, high-risk area.

At 212, the method also typically includes determining whether there are any detected incidences of fraud in past transactions associated with the customer account. If so, the method further includes increasing the cumulative risk level associated with the account by additional strikes (typically three).

At 216, the method typically includes determining whether there is no customer telephone number associated with the pending transaction. This may occur if the customer refuses to give a telephone number to the CSR, if the customer indicates that he does not own a telephone and/or that he cannot be reached at any telephone, or if the customer gives the CSR a telephone number that has been disconnected, is no longer in service, or is otherwise invalid. If there is no customer telephone number associated with the customer account, the method typically includes, at 218, increasing the cumulative risk level associated with the transaction by adding strikes (typically three).

At 220, the method typically includes determining whether there is a forced transfer of the order to the fraud queue, also referred to as a "forced strikeout," associated with the customer account. A forced strikeout is typically assigned to the account by a fraud clerk by selecting a forced-strikeout selector 358 via the customer information screen 350. A forced strikeout may be assigned for a variety of reasons. For example, a forced strikeout may be assigned by a fraud clerk investigating a periodic fraud report, as described below, with reference to FIG. 10. A forced strikeout may also be assigned for customer accounts that have had past fraud activity, or upon customer request, or for virtually any other reason.

At 222, if a forced strikeout is detected, the method typically includes assigning the predetermined fraud queue threshold value by adding strikes (normally three), to the cumulative risk level associated with the transaction. This causes the transaction to be placed in the fraud queue at 140, thereby forcing the transaction to strike out.

At 224, the method typically includes detecting whether the customer requesting the pending transaction has called from a public telephone. This is typically accomplished by detecting the telephone number of the customer telephone from ANI associated with the telephone call and comparing the detected telephone number with a predetermined list of public telephone numbers. If the telephone call is detected as originating from a public telephone, the method typically includes, at 226, assigning one or more strikes to the cumulative fraud risk level for the transaction. Alternatively, the method may include detecting whether the customer is calling from a public telephone in another manner.

At 228, the method typically includes determining whether the telephone call from the customer in the pending transaction originated in an area code outside the area code associated with the billing address. This may be accomplished by detecting the area code of the telephone of the customer from the ANI associated with the call, and comparing the detected area code with the area code of the telephone number associated with the billing address of the customer, as recorded at the customer service center.

Alternatively, the comparison may be accomplished by comparing the detected area code to a list of area codes associated with the ZIP code of the billing address via a lookup table. If it is determined that the call originated from outside an area code associated with the billing address of the customer, the method, at 230, typically includes increasing the cumulative risk level associated with the transaction by adding strikes (normally three).

In one embodiment of the invention, the customer account may be a telephone calling account with the same account designator as a preexisting account, such as a mileage account. For example, the customer may be the owner of a mileage account with a particular airline, and also be the owner of a telephone calling account having the same account number as the mileage account. This is convenient for the customer because the customer need not carry separate plastic cards for each account. Rather the number for both accounts may be on a single card. In this embodiment of the invention, the method may further include, at 232, determining whether the customer has a valid preexisting account with the same number as the telephone calling account. For example, a customer requesting purchase of telephone calling time on an account that is typically offered only to mileage account owners, but who does not personally own such a mileage account, may be committing fraud. Therefore, if no valid preexisting account is detected at 232, the method typically includes, at 234, increasing the cumulative risk level associated with the account by adding strikes (typically three).

Alternatively, any of the aforementioned fraud indicators may be selectively turned on and off, either arbitrarily or in some predetermined manner, to thwart prediction of the fraud indicators by fraudulent actors. In addition, the degree to which each detected fraud indicator affects the cumulative risk level for the pending transaction may be altered.

Figure 9:
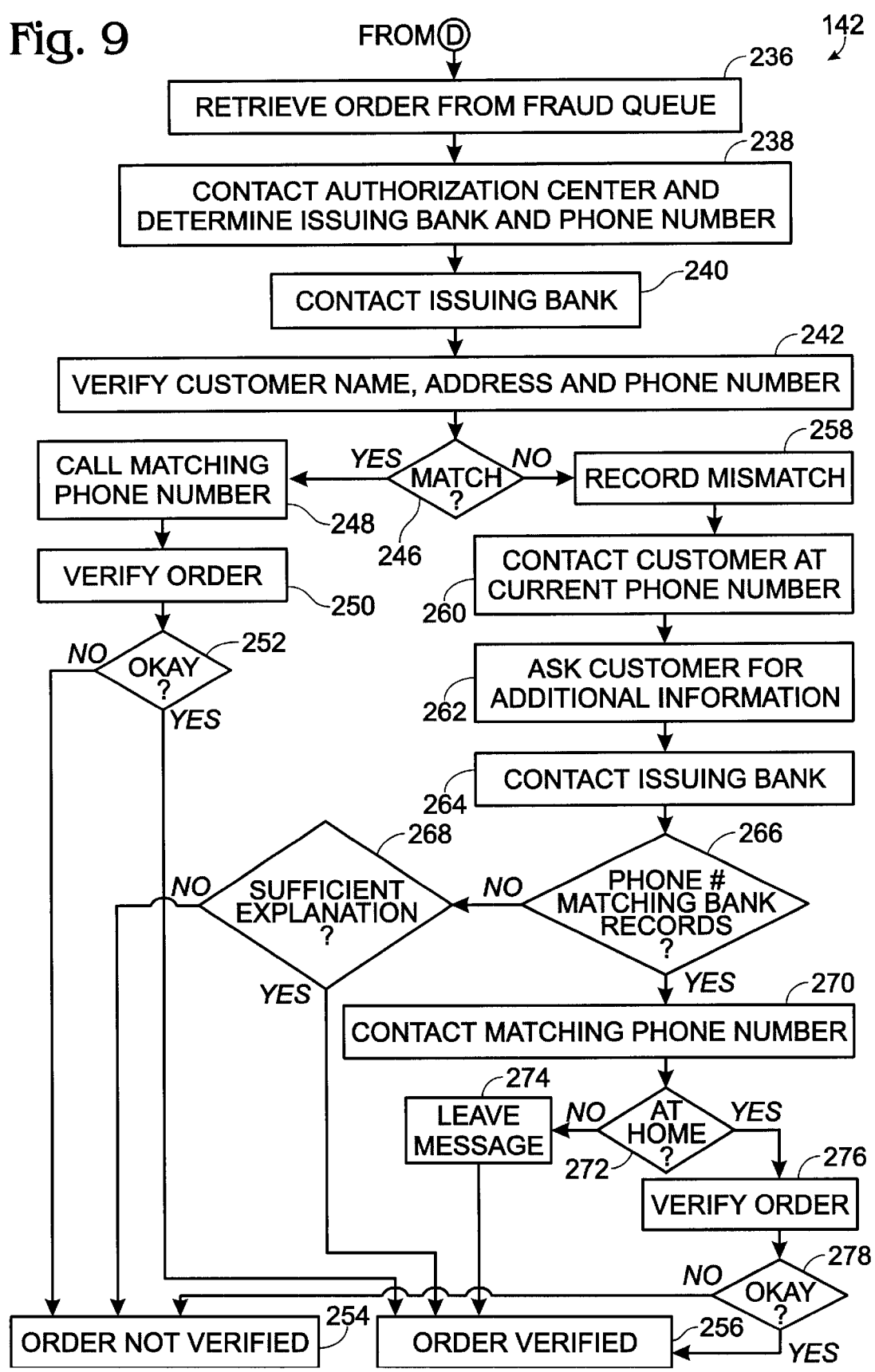
FIG. 9 is a detail flowchart of a portion of the method shown in FIG. 4

Turning now to FIG. 9, attempting to verify the order at 142 may include, as shown at 236, retrieving an order from the fraud queue. To accomplish this the fraud clerk typically opens the fraud queue console 450 and selects new order selector 452, revealing a list of queued new orders 460 in queue pane 458. The fraud clerk then selects a particular new queued order from the list, thereby opening fraud ticket window 500 with information about the selected new queued order.

At 238, the method typically includes contacting the authorization center and determining the telephone number of the issuer of the payment account given by the customer to the CSR to pay for the transaction. Typically, the fraud clerk contacts the authorization center via telephone. Alternatively, the fraud clerk may contact the authorization center via computer or other device, may obtain the telephone number of the of the issuer in another manner, or may not obtain the telephone number at all.

At 240, the method typically includes contacting the issuer 18*a* of the payment account, typically a bank. The contact may be from telephone 34 of the fraud clerk to telephone 60*a* at the issuer 18*a*, although another suitable contact device may be used, such as connecting computer 32 or 36 to computer 58*a*. At 242, the method typically includes verifying the customer name, address and/or telephone number with the issuer. This is usually accomplished by the fraud clerk reading the name, address, and/or telephone number to a representative of the issuer over the telephone, although facsimile, mail, or computerized verification may also be used. At 246, the method includes determining whether there is a match between the issuer records and the name, address, and/or telephone number for the customer account in the customer service center records. Issuer 18*a* will typically inform the fraud clerk whether or not the name, address, or telephone number given by customer 12 matches the corresponding records for the payment account kept by the issuer 18*a*. For security reasons, issuer 18*a* typically does not disclose to the fraud clerk the name, address, or telephone number of the customer on record with the issuer 18*a*.

If there is a match, the method, at 248, typically includes calling the matching telephone number, and at 250, verifying the order with the customer or another suitable person at the matching telephone number. At 252, the method includes determining whether the verification at 250 is acceptable. If the order is not verified, the method at 254 includes marking the order as not verified. If the order is verified, the method at 256 includes marking the order as verified.

At 258, if the customer name, and/or address, and/or telephone number on record with customer service center 14 do not match records of issuer 18*a*, then the method may include recording the mismatch in the customer service center database. Typically, the record mismatch is recorded by entering a comment in the comment region 352 of customer information screen 350 in FIG. 11. Alternatively, the comment may be entered into database 40 in another manner.

At 260, the method typically includes contacting customer 12 at a current telephone number. Typically the current telephone number is obtained when the order is first placed in the fraud queue at 140. The CSR typically explains to the customer that the order will take some time to process, and requests a current telephone number at which the customer service center may call the customer back within a short amount of time, such as an hour. The current telephone number is usually recorded in customer information 502 in customer information screen 500.

At 262, the method typically includes asking the customer for additional information to determine why there is a mismatch in the name, billing address, and/or telephone number on record at issuer 18*a* and customer service center 14. For example, the customer may explain that he or she recently moved, and issuer 18*a* does not have an updated billing address on record. The customer may then present the fraud clerk with a prior billing address that the customer believes may be on record with the issuer 18*a*.

The method typically includes, at 264, re-contacting the issuer, and, at 266, determining whether the name, address, and/or telephone number of the customer on record with issuer 18*a* match the additional information given by the customer at 262. If the records still do not match, at 268, the method includes determining whether, in spite of the lack of a match between the additional information given by the customer and issuer records, in the judgment of the fraud clerk the customer gave a sufficient explanation to explain the mismatch. If so, the order is marked as verified at 256, and ultimately fulfilled. If not, the order is marked as not verified at 254, and ultimately cancelled.

If the customer name, telephone number, and billing address given as additional information at 262 match existing issuer records, the method further may include, at 270, contacting the matching telephone number. At 272, the method includes determining whether the customer or another person related to or associated with the customer is at home. If not, at 274, the method includes leaving a message that the order will be fulfilled, and that if the order is not desired by the customer, the customer should call the customer service center upon receipt of the message. If the customer, customer relation, or customer associate is at home, the method includes, at 276, verifying the order with the customer, customer relation, or customer associate. At 278, the method includes determining whether the customer, customer relation, or customer associate indicates that the order is acceptable. If the order is acceptable, the order is marked as verified at 256, and ultimately fulfilled. If the order is indicated to be unacceptable or invalid, then the order is marked as unverified at 254, and ultimately cancelled.

Figure 10:
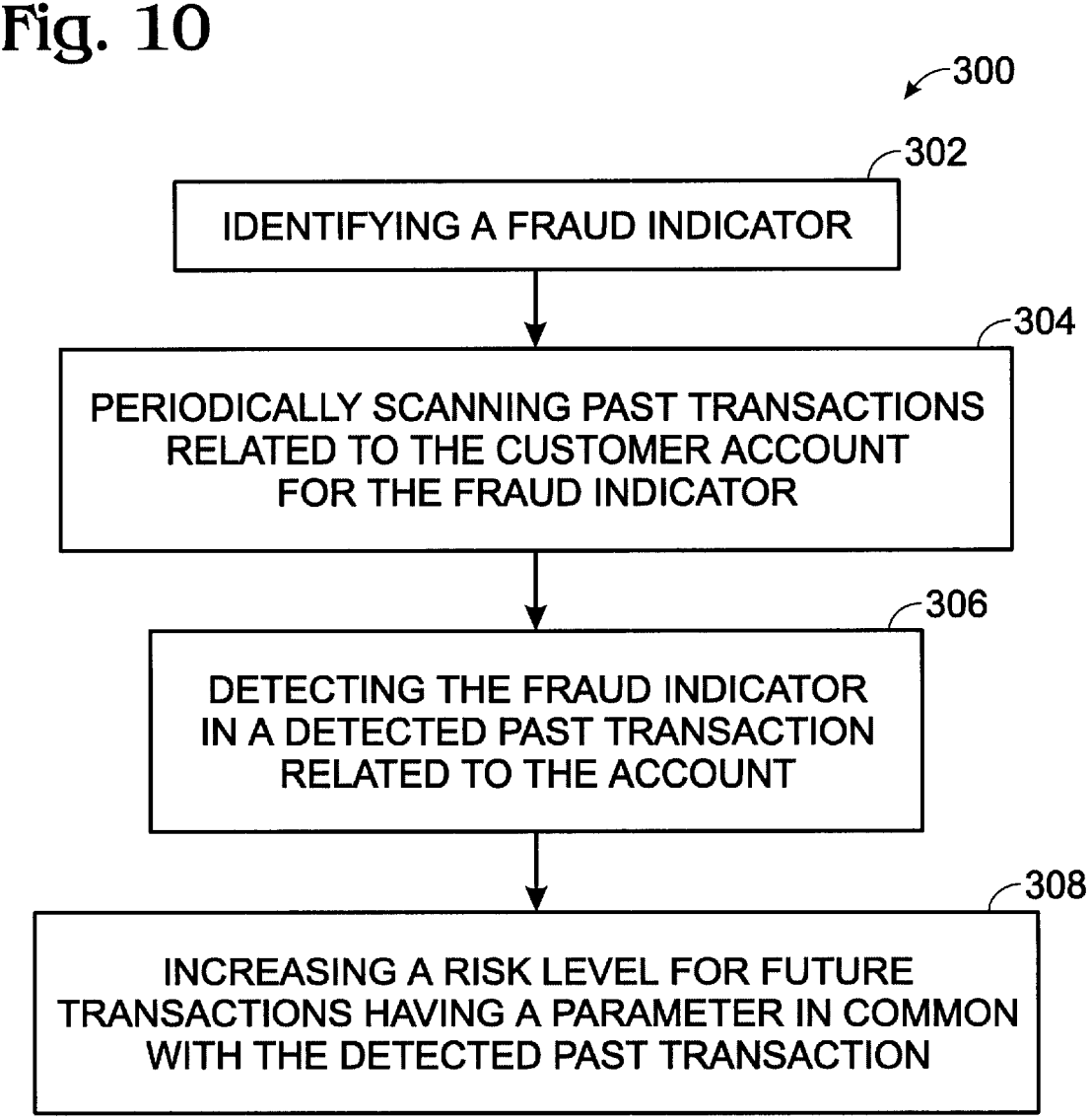
FIG. 10 is flowchart of another embodiment of a method for inhibiting fraud associated with a customer account.

FIG. 10 shows an embodiment of the present invention including a method 300 for inhibiting fraud associated with a customer account by periodically scanning past transactions on the account for fraud indicators. The method typically includes, at 302, identifying a fraud indicator. The fraud indicator may be (1) one customer using a plurality of payment accounts, (2) one payment account being used on a plurality of customer accounts, or (3) one payment account being used above a predetermined payment account use threshold, typically a dollar amount threshold or frequency of use threshold, or some other predetermined fraud indicator determined to indicate a risk of fraud on a customer account.

The method may also include, at 302, periodically scanning past transactions related to the customer account for the fraud indicator. This is typically accomplished by a transaction analysis program executed by server 38 and configured to analyze transaction records stored on database 40.

At 304, the method typically includes detecting the fraud indicator in a detected past transaction related to the account. The scanning typically occurs more than about once per week, preferably three times a week. Alternatively, the scanning may occur more or less frequently, such as nightly, or biweekly. Typically, reports are generated listing all detected past transactions containing the identified fraud indicator. The reports are typically electronic, but may also be generated on paper.

At 306, the method typically includes increasing a risk level for future transactions having a parameter in common with the detected past transaction. Typically, a fraud clerk evaluates the reports of detected past transactions containing the identified fraud indicators, and increases the risk level of future transactions associated with customer account by forcing all future transactions on the customer account to strike out. This is accomplished by selecting the strikeout selector 358 on the customer information screen 350. Alternatively, the fraud clerk may increase the risk level associated with future transactions associated with the customer account by blacklisting a payment account designator, customer name, customer account, billing address, or other account parameter. The fraud clerk may use his or her judgment when scanning the reports and elect not to increase the risk level for certain accounts in which past transactions identified fraud indicators are detected.

While the invention has been disclosed in its preferred form, the specific embodiments thereof as disclosed and illustrated herein are not to be considered in a limiting sense because numerous variations are possible. The subject matter of the invention includes all novel and non-obvious combinations and subcombinations of the various elements, features, functions, and/or properties disclosed herein. No single feature, function, element, or property of the disclosed embodiments is essential. The following claims define certain combinations and subcombinations which are regarded as novel and non-obvious. Other combinations and subcombinations of features, functions, elements, and/or properties may be claimed through amendment of the present claims or presentation of new claims in this or a related application. Such claims also are regarded as included within the subject matter of the present invention, irrespective of whether they are broader, narrower, or equal in scope to the original claims.

We claim:

1. A method for use in inhibiting fraud in a pending account activation or recharge transaction associated with a telephone calling account, the method comprising:

identifying one or more fraud indicators;

receiving a request for a telephone calling account activation or recharge transaction;

before fulfilling the request, examining past transactions and/or the pending transaction associated with the account for the presence of the fraud indicators;

by said examining, detecting at least one of the fraud indicators; and calculating a cumulative fraud risk level associated with the pending transaction based on the detected fraud indicators.

2. The method of claim 1, further comprising determining whether the cumulative fraud risk level meets or exceeds a predetermined threshold.

3. The method of claim 2, further comprising, if the cumulative fraud risk level meets or exceeds the predetermined threshold, verifying the request for the transaction with an owner of the account.

4. The method of claim 1, further comprising assigning a weighted value to each of the fraud indicators.

5. The method of claim 4, where calculating the cumulative fraud risk value includes adding the weighted values of each of the detected fraud indicators.

6. The method of claim 1, where at least one of the fraud indicators is a judgment of a customer service representative.

7. The method of claim 1, where at least one of the fraud indicators is a payment authorization failure.

8. The method of claim 7, where the payment authorization failure is a credit floor authorization failure.

9. The method of claim 7, where the payment authorization failure is a lost card authorization failure.

10. The method of claim 7, where the payment authorization failure is a stolen card authorization failure.

11. The method of claim 1, where at least one of the fraud indicators is an address verification failure.

12. The method of claim 1, where at least one of the fraud indicators is an excessive order history associated with the account.

13. The method of claim 12, where the excessive order history includes orders that exceed a predetermined monthly threshold.

14. The method of claim 13, where the predetermined monthly threshold is $150.

15. The method of claim 13, where the predetermined monthly threshold is $200.

16. The method of claim 12, where the excessive order history includes orders that exceed a predetermined weekly threshold.

17. The method of claim 16, where the predetermined weekly threshold is $100.

18. The method of claim 12, where the excessive order history includes more than one order on the same day.

19. The method of claim 12, where the excessive order history includes at least one order on each of at least two consecutive days.

20. The method of claim 1, where at least one of the fraud indicators is disputed charge associated with the account.

21. The method of claim 1, where at least one of the fraud indicators is a blacklisted payment account designator.

22. The method of claim 1, where at least one of the fraud indicators is a billing address in a predetermined area of high fraud risk.

23. The method of claim 1, where at least one of the fraud indicators is a customer calling from a telephone in an area of high fraud risk.

24. The method of claim 1, where at least one of the fraud indicators is a past occurrence of fraud associated with the customer account.

25. The method of claim 1, where at least one of the fraud indicators is a lack of a customer telephone number associated with the customer account.

26. The method of claim 1, where at least one of the fraud indicators is a forced strikeout associated with the customer account.

27. The method of claim 1, where at least one of the fraud indicators is receiving a request for the pending transaction from a public telephone.

28. The method of claim 1, where at least one of the fraud indicators is an area code of a caller who requested the pending transaction not matching a billing address associated with the account.

29. The method of claim 1, further comprising selectively turning off and on at least one of the fraud indicators.

30. A method for inhibiting fraud associated with activation or recharge of a customer telephone calling account, the method comprising:

identifying a fraud indicator;

periodically scanning past transactions related to the customer telephone calling account for the fraud indicator;

detecting the fraud indicator in a detected past transaction related to the account; and increasing a risk level for future activation or recharge transactions having a parameter in common with the detected past transaction.

31. The method of claim 30, where the fraud indicator is one customer using a plurality of payment accounts.

32. The method of claim 30, where the fraud indicator is one payment account being used on a plurality of customer accounts.

33. The method of claim 30, where the fraud indicator is one payment account being used above a predetermined payment account use threshold.

34. The method of claim 33, where the predetermined payment account use threshold is a dollar amount.

35. The method of claim 33, where the predetermined payment account use threshold is a frequency.

36. The method of claim 30, where periodically scanning includes scanning more than about once per week.

37. The method of claim 30, where periodically scanning includes scanning about three times per week.

38. The method of claim 30, where periodically scanning includes scanning about once per day.

39. The method of claim 30, where increasing the risk level includes increasing the risk level to above a predetermined threshold to cause the future transactions to be reviewed for fraud.

40. The method of claim 30, where the future transactions having a parameter in common with the detected past transactions are future transactions associated with the same customer account as the past transactions.

41. The method of claim 30, where the future transactions having a parameter in common with the detected past transactions are future transactions associated with the same payment account designator as the past transactions.

42. The method of claim 30, where the future transactions having a parameter in common with the detected past transactions are future transactions associated with the same customer name as the past transactions.

43. A method for detecting fraud in an account activation or recharge transaction associated with a customer account, the customer account having an owner, the method comprising:

identifying one or more fraud indicators;

receiving a request for an account activation or recharge transaction from a customer;

receiving a payment account designator having an associated payment account, the account designator being configured to facilitate payment of funds from the payment account;

detecting whether any of the fraud indicators are present in the pending account activation or recharge transaction and/or in past transactions associated with the customer account;

calculating a cumulative fraud risk level associated with the account activation or recharge transaction based on the detected fraud indicators;

determining whether the cumulative fraud risk level meets or exceeds a first, predetermined threshold; and if the cumulative fraud risk level meets or exceeds the first, predetermined threshold, then verifying the request for the account activation or recharge transaction.

44. The method of claim 43, further comprising determining whether the cumulative fraud risk level meets or exceeds a second, intermediate threshold.

45. The method of claim 44, further comprising, if the cumulative fraud risk level meets or exceeds the second, intermediate threshold, inserting comments regarding the order into the customer database commenting on the order.

46. The method of claim 43, where verifying includes calling a phone number of the customer and confirming the transaction with the customer.

47. The method of claim 46, where the phone number of the customer matches records of an issuer of the payment account.

48. A system for inhibiting fraud in a customer order associated with a customer account, the system comprising:

a computing device;

a database linked to the computing device, the database being configured to store information on past transactions associated with the customer account;

an order processing program executable on the computing device, the order processing program being configured to receive a customer telephone calling account activation or recharge order and assess a risk level for the order based on the past transactions related to the customer account stored in the database;

a fraud queue configured to receive the customer order if the risk level of the customer order exceeds a predetermined fraud risk threshold and hold the customer order pending verification of the order.

* * * * *